United States Patent
Chen et al.

(10) Patent No.: US 10,776,109 B2
(45) Date of Patent: Sep. 15, 2020

(54) MICROPROCESSOR WITH DYNAMICALLY ADJUSTABLE BIT WIDTH FOR PROCESSING DATA

(71) Applicant: Shanghai Zhaoxin Semiconductor Co., Ltd., Shanghai (CN)

(72) Inventors: Jing Chen, Beijing (CN); Xiaoyang Li, Beijing (CN); Juanli Song, Beijing (CN); Zhenhua Huang, Beijing (CN); Weilin Wang, Beijing (CN); Jiin Lai, New Taipei (TW)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 62 days.

(21) Appl. No.: 16/163,805

(22) Filed: Oct. 18, 2018

(65) Prior Publication Data
US 2019/0227799 A1    Jul. 25, 2019

(30) Foreign Application Priority Data
Jan. 19, 2018   (CN) .......................... 2018 1 0052695

(51) Int. Cl.
| | |
|---|---|
| G06F 9/22 | (2006.01) |
| G06F 9/30 | (2018.01) |
| G06F 9/448 | (2018.01) |
| G06F 7/499 | (2006.01) |
| G06F 7/533 | (2006.01) |
| G06F 15/78 | (2006.01) |

(Continued)

(52) U.S. Cl.
CPC .......... *G06F 9/223* (2013.01); *G06F 7/49942* (2013.01); *G06F 7/5332* (2013.01); *G06F 7/5336* (2013.01); *G06F 9/226* (2013.01); *G06F 9/3001* (2013.01); *G06F 9/3013* (2013.01); *G06F 9/30101* (2013.01); *G06F 9/30112* (2013.01); *G06F 9/3887* (2013.01); *G06F 9/4498* (2018.02); *G06F 15/7832* (2013.01); *G06N 3/063* (2013.01)

(58) Field of Classification Search
CPC ............................. G06F 9/223; G06F 9/30101
See application file for complete search history.

(56) References Cited

U.S. PATENT DOCUMENTS

| | | |
|---|---|---|
| 4,476,537 A | 10/1984 | Blau et al. |
| 4,649,470 A | 3/1987 | Bernstein et al. |

(Continued)

OTHER PUBLICATIONS

Danysh, A., et al.; "Architecture and Implementation of a Vector/SIMD Multiply-Accumulate Unit;" IEEE Transactions on Computers; vol. 54; No. 3; Mar. 2005; pp. 284.

*Primary Examiner* — Michael J Metzger
(74) *Attorney, Agent, or Firm* — McClure, Qualey & Rodack, LLP

(57) ABSTRACT

A microprocessor with dynamically adjustable bit width is provided, which has a bit width register, a datapath, a statistical register, and a bit width adjuster. The bit width register stores at least one bit width. The datapath operates according to the bit width stored in the bit width register to acquire input operands from received data and process input operands. The statistical register collects calculation results of the datapath. The bit width adjuster adjusts the bit width stored in the bit width register based on the calculation results collected in the statistical register.

18 Claims, 17 Drawing Sheets

(51) Int. Cl.
*G06F 9/38* (2018.01)
*G06N 3/063* (2006.01)

(56) References Cited

U.S. PATENT DOCUMENTS

| | | | |
|---|---|---|---|
| 5,187,795 A | | 2/1993 | Balmforth et al. |
| 6,223,196 B1* | | 4/2001 | Hattori ................ G06F 7/5443 |
| | | | 708/523 |
| 6,282,556 B1 | | 8/2001 | Chehrazi et al. |
| 6,397,238 B2 | | 5/2002 | Oberman et al. |
| 6,446,193 B1* | | 9/2002 | Alidina ................ G06F 9/3001 |
| | | | 712/16 |
| 6,692,534 B1 | | 2/2004 | Wang et al. |
| 7,047,394 B1 | | 5/2006 | Van Dyke et al. |
| 2002/0103841 A1* | | 8/2002 | Parviainen ........... G06F 7/5306 |
| | | | 708/523 |
| 2002/0112144 A1* | | 8/2002 | Tessarolo ........... G06F 9/30018 |
| | | | 712/29 |
| 2004/0230631 A1 | | 11/2004 | Busaba et al. |
| 2005/0278512 A1* | | 12/2005 | Ehlig ................ G06F 9/30018 |
| | | | 712/228 |
| 2007/0198815 A1* | | 8/2007 | Liu ...................... G06F 7/4812 |
| | | | 712/221 |
| 2010/0306292 A1* | | 12/2010 | Catherwood ....... G06F 9/30014 |
| | | | 708/209 |
| 2014/0281373 A1* | | 9/2014 | Nilsson .............. G06F 15/8053 |
| | | | 712/7 |

* cited by examiner

| opcode | subopcode | WLFLin | WLFLout | C | A | B |

| A | A3 | A2 | A1 | A0 |
|---|---|---|---|---|

*

| B | B3 | B2 | B1 | B0 |
|---|---|---|---|---|

| M | M3=A3*B3 | M2=A2*B2 | M1=A1*B1 | M0=A0*B0 |
|---|---|---|---|---|

| S | M0+M1+M2+M3 |
|---|---|

FIG. 11

PP4 [7|6|5]→B_PP4
PP5_1: unsigned 4, unsigned 8　[0|0|7]→B_PP5_1
PP5_2: (signed 4), (signed 8), 16, 32　[0|0|0]→B_PP5_2
PP6_1: 4, 8　[9|8|0]→B_PP6_1
PP6_2: 16, 32　[9|8|7]→B_PP6_2
PP7 [11|10|9]→B_PP7
PP8_1: unsigned 4　[0|0|11]→B_PP8_1
PP8_2: (signed 4), 8, 16, 32　[0|0|0]→B_PP8_2
PP9_1: 4　[13|12|0]→B_PP9_1
PP9_2: 8, 16, 23　[13|12|11]→B_PP9_2
PP10 [15|14|13]→B_PP10
PP11_1: unsigned 4, unsigned 8, unsigned 16　[0|0|15]→B_PP11_1
PP11_2: (signed 4), (signed 8), (signed 16), 32　[0|0|0]→B_PP11_2

FIG. 12A-2

FIG. 12B-2

MICROPROCESSOR WITH DYNAMICALLY ADJUSTABLE BIT WIDTH FOR PROCESSING DATA

CROSS REFERENCE TO RELATED APPLICATIONS

This Application claims priority of China Patent Application No. 201810052695.6, filed on Jan. 19, 2018, the entirety of which is incorporated by reference herein.

BACKGROUND OF THE INVENTION

Field of the Invention

The present invention relates to a microprocessor, and more particularly to a neural network microprocessor or accelerator for implementing a neural network algorithm.

Description of the Related Art

Artificial intelligence technology often uses neural networks to build a machine-learning architecture. Neural networks involve many complex calculations, especially involving large numbers of tensor multiplications and multiply-and-accumulate calculations. How to design a microprocessor architecture suitable for neural network computing based on the particularity of neural network algorithms is an important topic in the technical field.

BRIEF SUMMARY OF THE INVENTION

A microprocessor with dynamically adjustable bit width in accordance with an exemplary embodiment of the invention has a bit width register, a datapath, a statistical register and a bit width adjuster. The bit width register stores at least one bit width. The datapath operates according to the bit width stored in the bit width register to acquire input operands from received data and process input operands. The statistical register collects calculation results of the datapath. The bit width adjuster adjusts the bit width stored in the bit width register based on the calculation results collected in the statistical register.

The microprocessor of the invention considers the dynamically-changed bit width (WL, FL) required in neural network computing in hardware design. The variable bit width considerably accelerates the neural network computing.

In an exemplary embodiment, the bit width indicates a word length. Data received by the datapath includes an integer part and a fractional part, and the word length is the total length of the integer part and the fractional part.

In an exemplary embodiment, the bit width indicates a fraction length. Data received by the datapath includes an integer part and a fractional part, and the fraction length is the length of the fractional part.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 5 illustrates a microinstruction (μop) format in accordance with an embodiment of the invention;

FIG. 9 uses different word lengths (WL) to illustrate the operands acquired from A and B indicated in the microinstruction (μop) format of FIG. 5;

FIG. 11 shows an example in which the word length WL is 8 bits, and the data M and S calculated during the multiply-and-accumulate calculation are shown;

FIGS. 12A-1, 12A-2, 12B-1, and 12B-2 depict the 3-bit acquisition, of B for the various word length WL;

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

Artificial intelligence is a major development in the field of science and technology, which often uses neural networks to form a machine learning framework. Neural networks include multi-layer calculations. Many convolution calculations are required in each layer, so most of computation is multiply-and-accumulate calculations and multiplication. The neural network microprocessor architecture designed by the present invention is specifically optimized in hardware for massive multiply-and-accumulate calculations and multiplication. Fixed point numbers are used in the calculations and each number is divided into an integer part and a fractional part (i.e. a decimal part). The total bit number of the integer part and the fractional part is regarded as a word length (labeled as WL). The number of bits of the fractional part is regarded a fraction length (labeled as FL). The word length WL or the fraction length FL may be indicated in information of bit width. Generally, the bit width of fixed point numbers used in a microprocessor is fixed after the algorithm or procedure is programmed. In the present invention, however, the bit width (e.g. the word length WL and/or the fraction length FL) is not fixed. In this manner, the adaptation requirement of the bit width (WL, FL) for approximation of a neural network is considered in hardware implementation.

Figure 1:
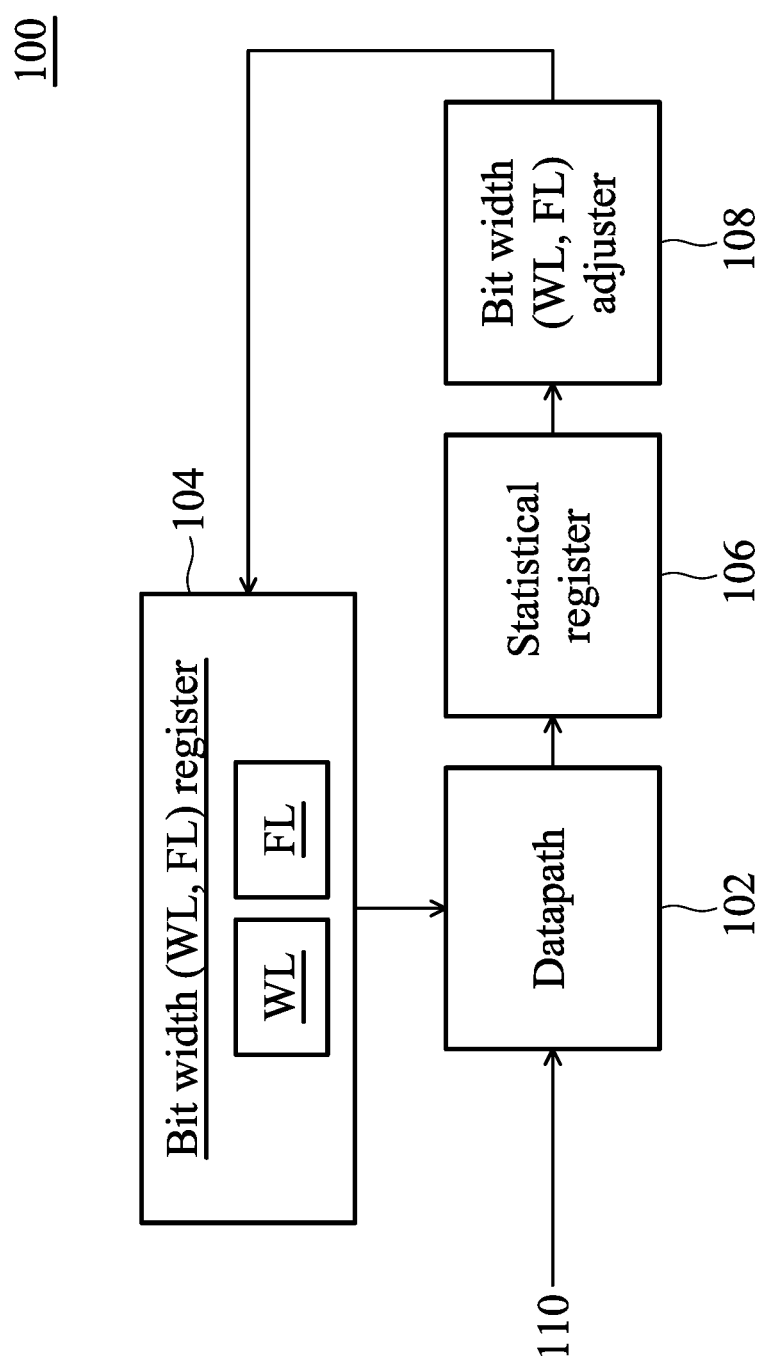
FIG. 1 depicts a hardware architecture implemented in a microprocessor 100 for neural network computing in accordance with an embodiment of the invention.

FIG. 1 depicts a hardware architecture implemented in a microprocessor 100 for neural network computing in accordance with an embodiment of the invention, including a datapath 102, a bit width register 104 for recording the bit width (WL, FL), a statistical register 106, and a bit width adjuster 108 for adjusting the bit width (WL, FL).

The datapath 102 is a combination of arithmetic logic operation units (ALUs) and can implement multiply-and-accumulate calculations or multiplication required in neural network computing and can also implement max pooling or average calculations. According to a microinstruction (μop), the datapath 102 gets data 110 from registers or a memory. Input operands are contained in the data 110. Based on the bit width, including a word length WL and a fraction length FL, indicated in the bit width register 104, the datapath 102 processes the input operands contained in the data 110. For example, in a multiply-and-accumulate calculation, the operand length used in the multipliers within the datapath 102 is set as the word length WL, and the position of a decimal point depends on the fraction length FL. In an exemplary embodiment, the bit width register 104 for recording the bit width (WL, FL) is implemented as a special purpose register (SPR) which is provided for setting control parameters of the datapath 102. The datapath 102 is instructed by the aforementioned microinstruction (μop) to operate according to the word length WL and fraction length FL indicated in the bit width register 104. The statistical register 106 and the bit width adjuster 108 are provided to adjust the word length WL and the fraction length FL recorded in the bit width register 104.

The statistical register 106 collects calculation results from the datapath 102. Based on the calculation result collected in the statistical register 106, the bit width adjuster 108 adjusts the word length WL and the fraction length FL. The microinstruction (μop) may indicate the storage target of the adjusted word length WL and fraction length FL. Later, the adjusted word length WL and fraction length FL are stored to the bit width register 104 by another microinstruction (μop) to be retrieved by the datapath 102 for calculation corresponding to the new microinstruction (μop).

In an exemplary embodiment, the bit width register 104 stores two sets of bit width, (WL0, FL0) and (WL1 and FL1), which are alternately used (a ping-pong mode). When the datapath 102 operates according to the bit width (WL0, FL0), the bit width adjuster 108 gradually adjusts the values of (WL1, FL1). When the datapath 102 operates according to the bit width (WL1, FL1), the bit width adjuster 108 gradually adjusts the values of (WL0, FL0). The aforementioned microinstruction (μop) can indicate the source of the applied bit width and the temporary storage target of the adjusted values. In an exemplary embodiment, a first microinstruction (μop) indicates that (WL0, FL0) is the source and (WL1, FL1) is the target to be adjusted. According to the first microinstruction (μop), the datapath 102 operates according to the bit width (WL0, FL0) and the values of (WL1, FL1) are gradually adjusted. Then, a second microinstruction (μop) is received which indicates that (WL1, FL1) is the source and (WL0, FL0) is the target to be adjusted. According to the second microinstruction (μop), the datapath 102 operates according to the bit width (WL1, FL1) and the values of (WL0, FL0) are gradually adjusted.

In an exemplary embodiment, the aforementioned ping-pong switching of bit width is performed at the end of each layer of neural network computing. For example, the first layer of neural network operates according to bit width (WL0, FL0) with the updating of (WL1, FL1), the second layer of neural network operates according to bit width (WL1, FL1) with the updating of (WL0, FL0), the third layer of neural network operates according to bit width (WL0, FL0) with the updating of (WL1, FL1), and so on.

In another exemplary embodiment, the bit width (WL, FL) used for storage is different from that used in calculations. A word length used in storing data in a system memory is regarded as a word length WL for storage. A fraction length used in storing a decimal part of data in the system memory is regarded as a fraction length FL for storage. A word length used in the datapath 102 for calculation is regarded as a word length WL for calculation. A fraction length used in the datapath 102 for calculation of decimals is regarded as a fraction length FL for calculation. In this example, the bit width register 104 stores four sets of bit width, (WL0, FL0) for storage, (WL0, FL0) for calculation, (WL1, FL1) for storage, and (WL1, FL1) for calculation. In neural network computing, the former layers may correspond to the longer word length WL, and the later layers may correspond to the shorter word length WL. The word length WL usually decreases with the layers of processing of a neural network. For example, the word length may decrease from 16 bits to 4 bits. The fraction length FL determines a dynamic range of data in each layer. In a case wherein the word length WL is fixed, the longer fraction length FL corresponds to the shorter integer part, the smaller dynamic range, and the higher calculation precision. The dynamic variation of bit width (WL, FL) depends on the input data of the neural network. The bit width (WL, FL) is dynamically adjusted during the calculations which benefits the precision.

The details of bit width adjustment are discussed in the following.

First, WL0 and FL0 for storage and for calculation are assigned initial values. The word length WL for storage is initially made equal to the word length WL for calculation, the same as the word length WL set for the first layer of neural network computing (such as 16 bits). The fraction length FL for storage is initially made equal to the fraction length FL for calculation, which is an initial fixed value calculated by software in advance.

In the $n_{th}$ layer of the neural network, the bit width (WL0, FL0) for storage and the bit width (WL0, FL0) for calculation are used to process the input data, the output data is output based on the bit width (WL1, FL1) for storage, and optimized bit width (WL1, FL1) for calculation is generated. The datapath 102 gets input data from a system memory according to the bit width (WL0, FL0) for storage (the first bit width), and makes calculations on the input data according to the bit width (WL0, FL0) for calculation (the second bit width). The datapath 102 outputs the calculation results according to the bit width (WL1, FL1) for storage (the third bit width). During the calculations and the result outputting, the bit width adjuster 108 gradually adjusts the bit width (WL1, FL1) for calculation (the fourth bit width) for the next layer of neural network computing. When the $n_{th}$ layer finishes, the bit width (WL1, FL1) for calculation has been optimized to the optimum value for the $n_{th}$ layer (e.g., WL is optimized to 8 bits). Note that the bit width (WL1, FL1) for storage (the third bit width) is not changed (WL is kept 16 bits) yet.

In the $(n+1)_{th}$ layer of the neural network, the bit width (WL1, FL1) for storage and the bit width (WL1, FL1) for calculation are used to process the input data, the output data is output based on the bit width (WL0, FL0) for storage, and optimized bit width (WL0, FL0) for calculation is generated. The datapath 102 gets input data from the system memory according to the bit width (WL1, FL1) for storage (the third bit width, in which WL is still 16 bits), and makes calculations on the input data according to the bit width (WL1, FL1) for calculation (the fourth bit width, in which WL has been optimized to 8 bits in the $n_{th}$ layer). Thus, bit shifting is required for processing the input data. The datapath 102 outputs the calculation results according to the bit width (WL0, FL0) for storage (the first bit width). During the calculations and the result outputting, the bit width adjuster 108 gradually adjusts the bit width (WL0, FL0) for calculation (the second bit width) of the next layer or the next layer of neural network computing. For example, the bit width (WL0, FL0) for calculation may be adjusted to 4 bits. Note that the bit width (WL0, FL0) for storage (the first bit width) is updated by the fourth bit width (the bit width (WL1, FL1) for calculation that has been optimized to a word length WL of 8 bits) after the calculations of the $n_{th}$ layer are finished. As the above discussion, in the $n_{th}$ layer, the final value of the optimized bit width (to be stored as the fourth bit width, i.e. the bit width (WL1, FL1) for calculation) is determined after the final calculation of the $n_{th}$ layer. Thus, the $n_{th}$ layer outputs data according to the third bit width (i.e. the bit width (WL1, FL1) for storage) rather than the optimized bit length. After all calculations in the $n_{th}$ layer are completed, the optimized bit width (stored as the fourth bit width, i.e. the bit width (WL1, FL1) for calculation) are used to update the bit width (WL0, FL0) for storage (the first bit width). The updated version of the first bit width (i.e. the updated bit width (WL0, FL0) for storage), therefore, can be used in the $(n+1)_{th}$ layer for the datapath 102 to output the calculation results. For example, the datapath 102 outputs the calculation results of the $(n+1)_{th}$ layer in accordance with the 8-bit word length.

The above two steps are repeated until all layers of the neural network computing are completed.

In the present exemplary embodiment, in the nth layer, the datapath 102 outputs the calculation results according to the bit width (WL1, FL1) for storage (i.e. the third bit width). At the end of the nth layer, the bit width adjuster 108 updates the bit width (WL0, FL0) for storage (the first bit width) based on the bit width optimized during the nth layer and recorded as the bit width (WL1, FL1) for calculation (i.e. the fourth bit width). In the (n+1)th layer, the datapath 102 outputs the calculation result according to the updated version of the bit width (WL0, FL0) for storage (i.e. the first bit width). At the end of the (n+1)th layer, the bit width adjuster 108 updates the bit width (WL1, FL1) for storage (the third bit width) based on the bit width optimized during the (n+1)th layer and recorded as the bit width (WL0, FL0) for calculation (i.e. the second bit width).

In an exemplary embodiment, the statistical register 106 is a general purpose register (GPR) that stores the operands for the datapath 102. For example, each layer of a neural network may involve tens of thousands of multiply-and-accumulate calculations. Such a large number of multiply-and-accumulate results can be collected by the statistical register 106 sector by sector and, accordingly, the bit width adjuster 108 adjusts the bit width (WL, FL). In an exemplary embodiment, the statistical register 106 is in a bit width of 40 bits and capable of handling 32-bit, 16-bit, 8-bit, 4-bit, 2-bit or 1-bit calculations.

Figure 2:
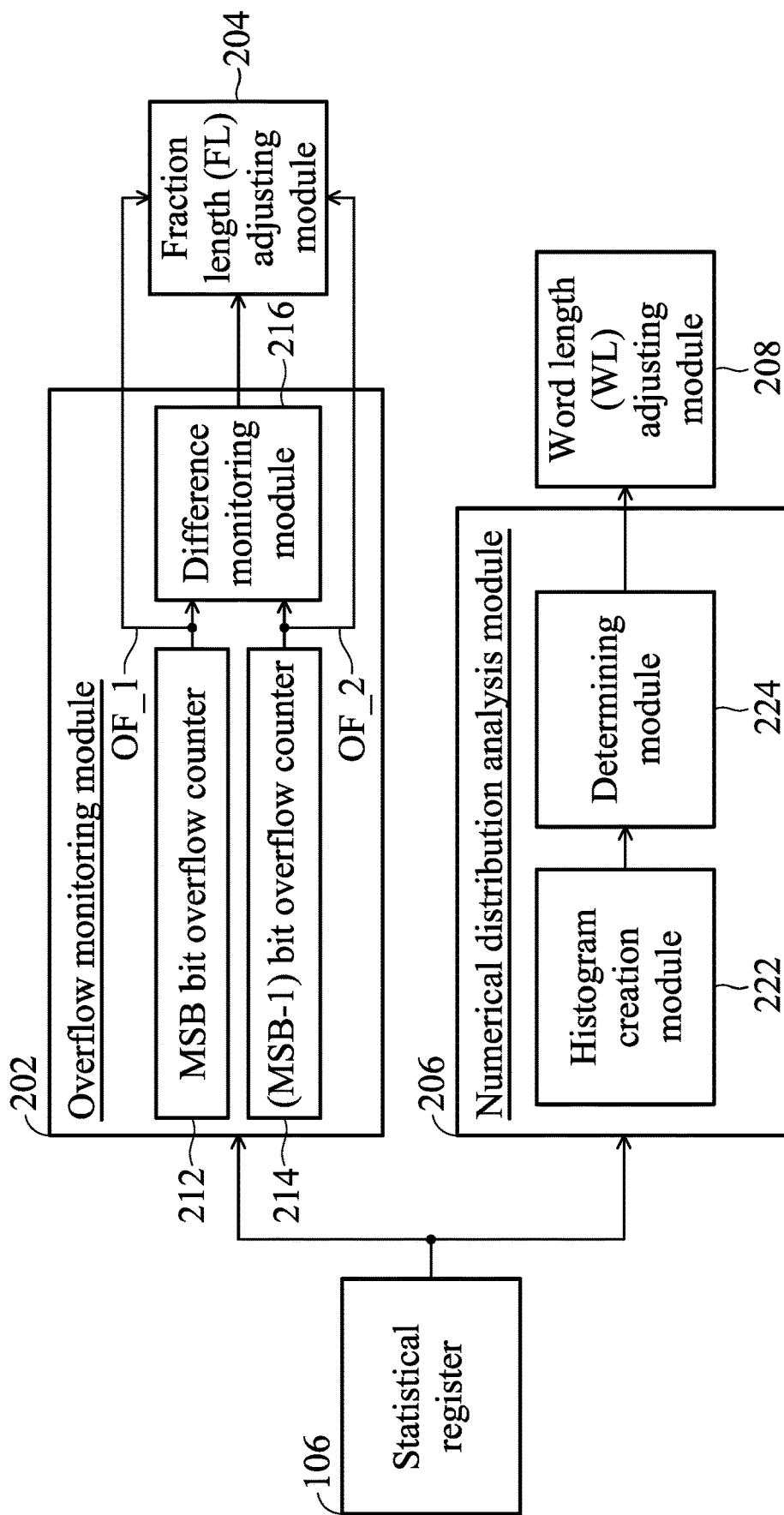
FIG. 2 illustrates the bit width adjuster 108 in accordance with an exemplary embodiment of the invention.

FIG. 2 illustrates the bit width adjuster 108 in accordance with an exemplary embodiment of the invention. An overflow monitoring module 202 monitoring overflows of the statistical register 106 is provided and, accordingly, the bit width (WL, FL) is adjusted. In an exemplary embodiment, when the number of overflows on the most significant bit (MSB) of every calculation results collected in the statistical register 106 exceeds a threshold, the fraction length FL adjusting module 204 decreases the fraction length FL. When the number of overflows on the next significant bit (the (MSB−1) bit) of every calculation result collected in the statistical register 106 exceeds a threshold corresponding to the (MSB−1) bit, the fraction length FL adjusting module 204 increases the fraction length FL. In another exemplary embodiment, the overflow monitoring module 202 for the adjustment of the bit width (WL, FL) may monitor the overflows on the MSB bit without monitoring the overflows on the (MSB−1) bit. In an exemplary embodiment, when the fraction length FL is adjusted, the word length WL remains unchanged. Furthermore, a numerical distribution analysis module 206 is provided to perform a numerical distribution analysis on the calculation results collected in the statistical register 106 and, accordingly, the bit width (WL, FL) is adjusted. In an exemplary embodiment, when the calculation results collected by the statistical register 106 are sparsely distributed on some numbers (with a sparse degree higher than a high threshold), a word length WL adjusting module 208 reduces the word length WL. When the calculation results collected by the statistical register 106 are evenly distributed over different numbers (with a sparse degree lower than a low threshold), the word length WL adjusting module 208 increases the word length WL. In an exemplary embodiment, when the word length WL is adjusted, the fraction length FL keeps unchanged.

The overflow monitoring module 202 depicted in FIG. 2 may include an MSB bit overflow counter 212, an (MSB−1) bit overflow counter 214, and a difference monitoring module 216. From the calculation results collected in the statistical register 106, the MSB bit overflow counter 212 counts an MSB bit overflow count OF_1 and the (MSB−1) bit overflow counter 214 counts an (MSB−1) bit overflow count OF_2. The difference monitoring module 216 monitors the difference between the overflow counts OF_1 and OF_2. The fraction length FL adjusting module 204 adjusts the fraction length FL based on the difference between the overflow counts OF_1 and OF_2. When the MSB bit overflow count OF_1 is greater than the (MSB−1) bit overflow count OF_2 by a threshold or the (MSB−1) bit overflow count OF_2 is greater than the MSB bit overflow count OF_1 by a threshold, the fraction length FL adjusting module 204 is activated to adjust the fraction length FL based on the overflow counts OF_1 and OF_2.

The numerical distribution analysis module 206 includes a histogram creation module 222 and a determining module 224. By the histogram creation module 222, the numerical distribution of the calculation results collected in the statistical register 106 is shown. The horizontal axis indicates the values of the calculation results (e.g., for WL=8 bits, 0 to $(2^8-1)$ are indicated along the horizontal axis). The vertical axis indicates the number of calculation results falling within each numerical range. The determining module 224 classifies the numerical distribution. In an exemplary embodiment, when a sparse degree of the numerical distribution is higher than a high threshold, or lower than a low threshold, the word length WL adjusting module 208 is activated to adaptively adjust the word length WL. One characteristic of neural network computing is that the former layer corresponds to the lower sparse degree of calculation results and the longer word length WL is required. The later layer corresponds to the greater sparse degree of calculation results and the shorter word length WL is required. Thus, the word length WL adjusting module 208 decreases the word length WL for calculation results concentrated on a few particular ranges (high sparse degree) and increases the word length WL for calculation results uniformly distributed on different values (low spare degree). The sparse degree of calculation results is determined based on whether the calculation results uniformly fall on the different statistical ranges (monitored by the histogram creation module 222) or not. In a case wherein the word length WL is 8 bits, the calculation results are in a range from 0 to $2^8$ (256). The following table shows the numerical distribution of 2000 calculation results obtained from a histogram.

| Numerical range | 0-15 | 16-31 | 32-47 | 48-63 | ... | 241~256 |
|---|---|---|---|---|---|---|
| Number of calculation results falling within the different numerical ranges | 1500 | 20 | 30 | 150 | ... | 100 |

The number of calculation results falling within the numerical range [0-15] is the largest. In comparison with the remaining ranges, the number of calculation results falling within the numerical ranges [48-63] and [241-256] is considerably large. The number of calculation results falling within the remaining ranges is relatively small. The numerical distribution is not uniform (or not even) and is highly concentrated near 0. Such kind of status is considered as the sparse degree is high. The word length WL adjusting module 208, therefore, reduces the word length WL (for example, reduced to 4 bits). The reduction of the word length WL should be controlled to guarantee the inference precision of the later stages following the neural network.

Figure 3:
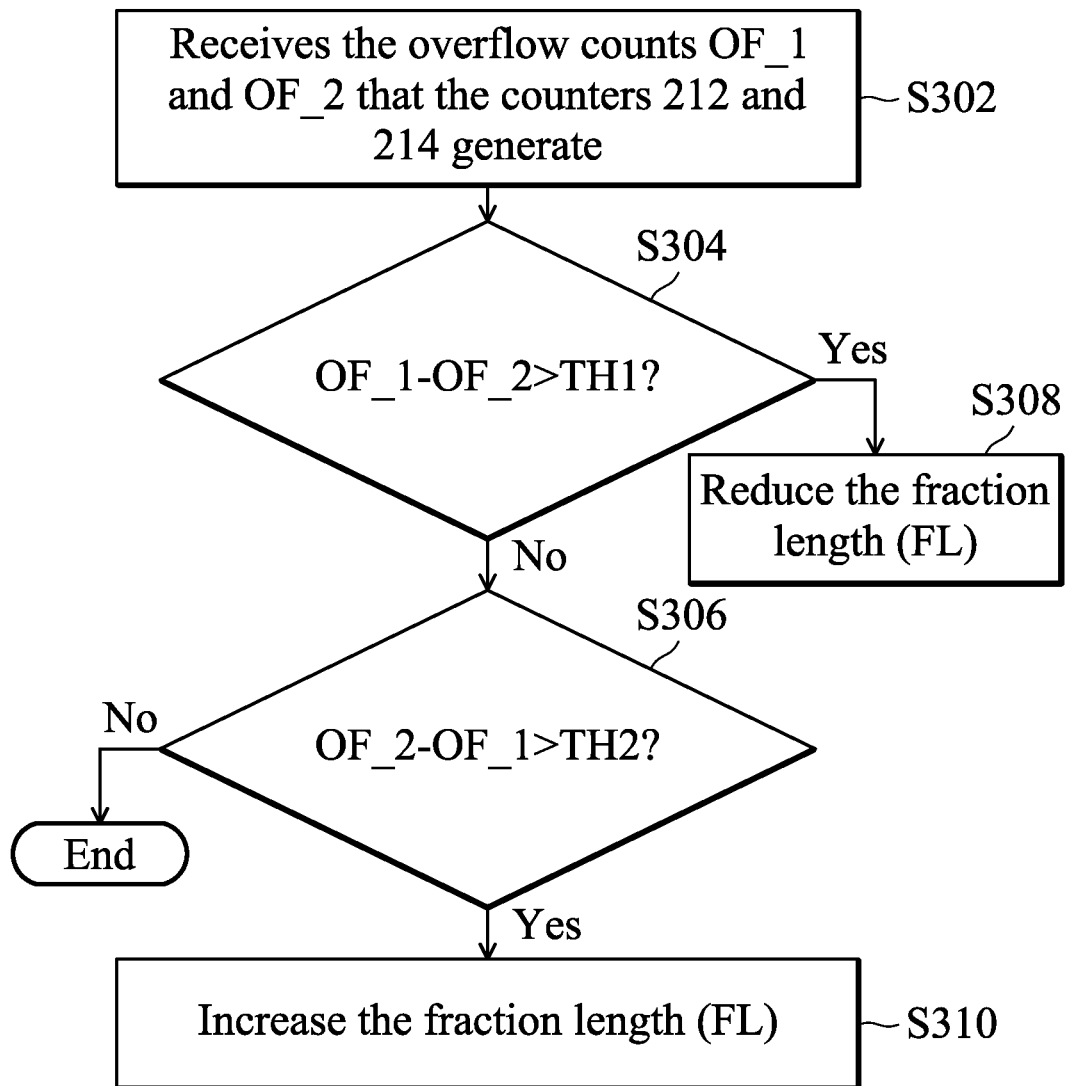
FIG. 3 is a flowchart illustrating the operations of the difference monitoring module 216 and the fraction length FL adjusting module 204 in accordance with an exemplary embodiment of the invention.

FIG. 3 is a flowchart illustrating the operations of the difference monitoring module 216 and the fraction length FL adjusting module 204 in accordance with an exemplary embodiment of the invention, which may be implemented in the microprocessor 100 by software and hardware co-design. Step S302 receives the overflow counts OF_1 and OF_2 that the counters 212 and 214 generate based on the calculation results collected in the statistical register 106. Step S304 determines whether the count difference (OF_1−OF_2) is greater than a threshold TH1, i.e., determining whether the MSB bit overflow count is greater than the (MSB−1) bit overflow count by the threshold TH1. If not, step S306 is performed to determine whether the count difference (OF_2−OF_1) is greater than a threshold TH2, i.e., determining whether the (MSB−1) bit overflow count is greater than the MSB bit overflow count by the threshold TH2. If not, the flow ends and the fraction length FL is not changed. Otherwise, step S310 is performed to increase the fraction length FL and thereby the calculation precision is improved. When the determination made in step S304 is YES, step S308 is performed to reduce the fraction length FL without changing the word length WL. The integer part, therefore, is represented by more bits, thus the dynamic range of the input operand is enlarged, suppressing the overflows on MSB.

Figure 4:
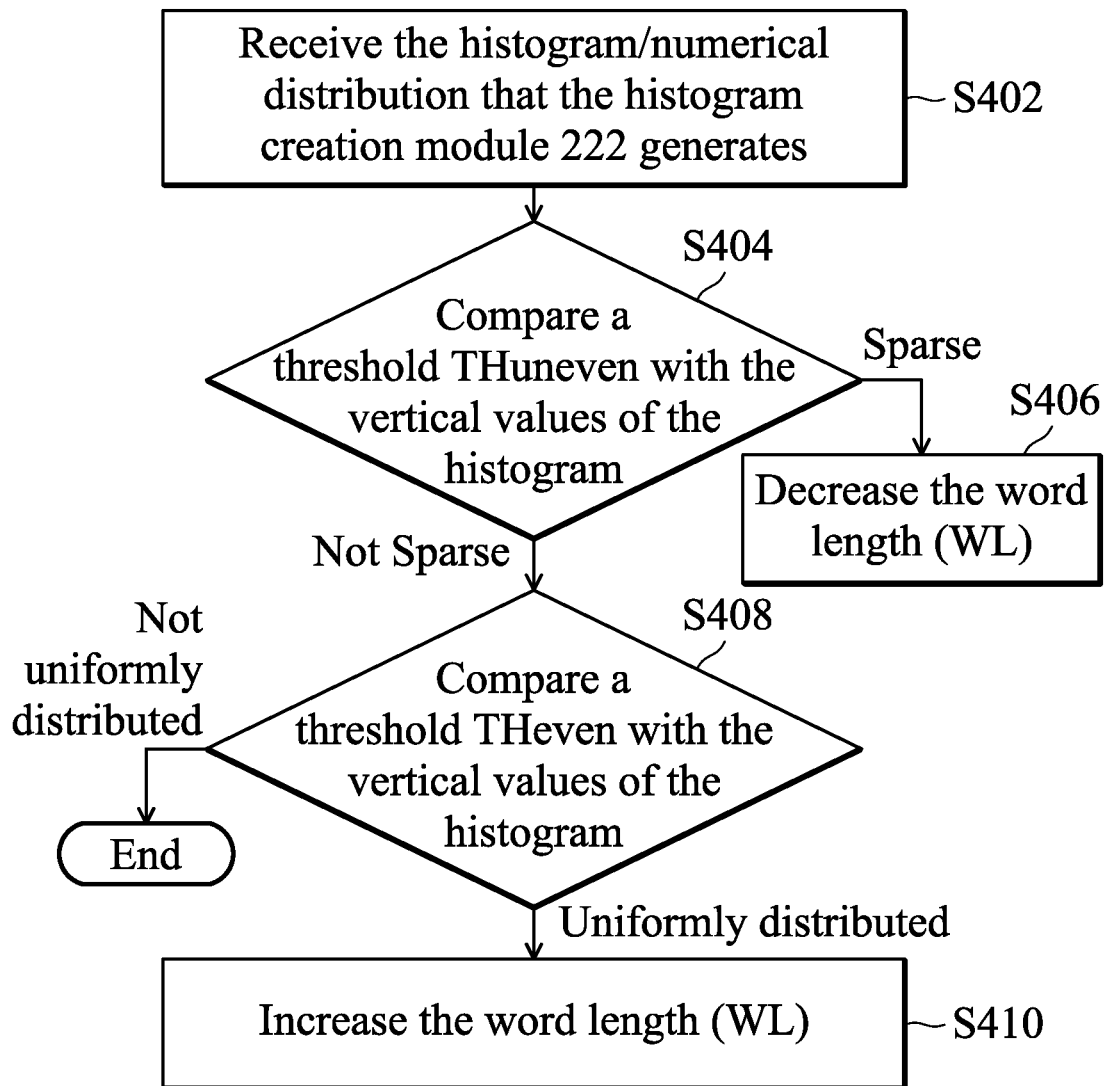
FIG. 4 is a flowchart illustrating the determining module 224 and the word length WL adjusting module 208 in accordance with an exemplary embodiment of the invention.

FIG. 4 is a flowchart illustrating the determining module 224 and the word length WL adjusting module 208 in accordance with an exemplary embodiment of the invention, which may be implemented in the microprocessor 100 by software and hardware co-design. Step S402 receives the histogram/numerical distribution that the histogram creation module 222 generates based on the calculation results collected in the statistical register 106. In step S404, a sparse degree of the histogram/numerical distribution is judged. The vertical values of the histogram or the number of calculation results within each numerical range are compared with a threshold THuneven to determine whether the numerical distribution is concentrated in some ranges. The higher sparse degree means that the neural network proceeds to the later layers, and step S406 is performed to decrease the word length WL and guarantee the inference precision. Otherwise, step S408 is performed and another threshold THeven (lower than the threshold THuneven) is compared with the vertical values of the histogram or the number of calculation results within each numerical range to determine whether the numerical distribution is even. If yes, it means that the calculation results of this layer are uniformly distributed over the different numerical ranges (i.e., the numerical distribution is at a uniform status). The neural network is still in the former layers and step S410 is performed to increase the word length WL. The accuracy and resolution of calculations, therefore, are improved. When it is determined in step S408 that the histogram/numerical distribution is not qualified as uniformly distributed (or not at a uniform status), the flow ends and the word length WL is not changed. In general, the former layers of neural network computing involve calculations of dense matrices which require a longer word length WL. In the later layers, the required word length WL is much shorter. The microprocessor 100 with adaptive and dynamically adjustable word length successfully approaches neural network calculations.

In some exemplary embodiments, the word length WL keeps unchanged when the fraction length FL is adjusted in accordance with the flowchart of FIG. 3. Not only is the decimal point position adjusted, the bit length representing the integer part is also adjusted. In some exemplary embodiments, the fraction length FL remains unchanged when the word length WL is adjusted in accordance with the flowchart of FIG. 4. According to the bit width adjustment of the invention, the decimal point position/integer bit length is adjusted.

FIG. 5 illustrates a microinstruction (μop) format in accordance with an embodiment of the invention. The microinstruction (pop) may be a single instruction multiple data (SIMD) instruction that instructs the datapath 102 to operate. An operation code is indicated in a field "opcode". For example, a multiply-and-accumulate calculation or multiplication may be indicated in the field "opcode". A sub-operation code is indicated in the field "subopcode". For example, the field "subopcode" may be designed to instruct the datapath 102 to clear the statistical register 106 or make values stored in the statistical register 106 saturated and rounded (by a saturation arithmetic or a rounding arithmetic). The field "WLFLin" is provided to indicate a source of bit width (WL, FL) for calculations of the datapath 102. The field "WLFLout" is provided to indicate a target to temporarily store the adjusted version of bit width (WL, FL). In an exemplary embodiment, some microinstructions fill the filed "WLFLin" as (WL0, FL0) and the filed "WLFLout" as (WL1, FL1), and some microinstructions fill the filed "WLFLin" as (WL1, FL1) and the filed "WLFLout" as (WL0, FL0). The ping-pong switching required to train the bit width (WL, FL) is performed.

In another exemplary embodiment, the bit width (WL0, FL0) includes two sets of values, bit width (WL0, FL0) for storage and bit width (WL0, FL0) for calculation, and the bit width (WL1, FL1) includes two sets of values, bit width (WL1, FL1) for storage and bit width (WL1, FL1) for calculation. The datapath 102 acquires input operands according to the bit width (WL0, FL0) for storage, performs calculations according to the bit width (WL0, FL0) for calculation, and outputs calculation results of this layer according to the bit width (WL1, FL1) for storage. Meanwhile, the bit width adjuster 108 adjusts the bit width (WL1, FL1) for calculation. When this layer finishes, the bit width adjuster 108 updates the bit width (WL0, FL0) for storage by the bit width (WL1, FL1) for calculation that has been adjusted. In the next layer, the datapath 102 acquires input operands according to the bit width (WL1, FL1) for storage, performs calculations according to the bit width (WL1, FL1) for calculation, and outputs calculation results of this layer according to the bit width (WL0, FL0) for storage. Meanwhile, the bit width adjuster 108 adjusts the bit width (WL0, FL0) for calculation. When this layer finishes, the bit width adjuster 108 updates the bit width (WL1, FL1) for storage by the bit width (WL0, FL0) for calculation that has been adjusted.

The field "C" corresponds to a destination operand, which may indicate a general purpose register (GPR) or a memory position to store the calculation results (an output operand) of the datapath 102. The fields "A" and "B" correspond to source operands, which may indicate a general purpose register (GPR) or a memory position to get input data for calculations of the datapath 102. In addition, the present invention further introduces a microinstruction for initializing the different sets of bit width, (WL0, FL0) and (WL1, FL1) in the bit width register 104.

The microinstruction (μop) instructing the datapath 102 may have various formats. Some modifications may be made on the μop format to cope with the hardware changes of the datapath 102. In order to enhance the compatibility between generations of products, a technique converting macroinstructions to microinstructions (μops) for different products is introduced here.

Figure 6:
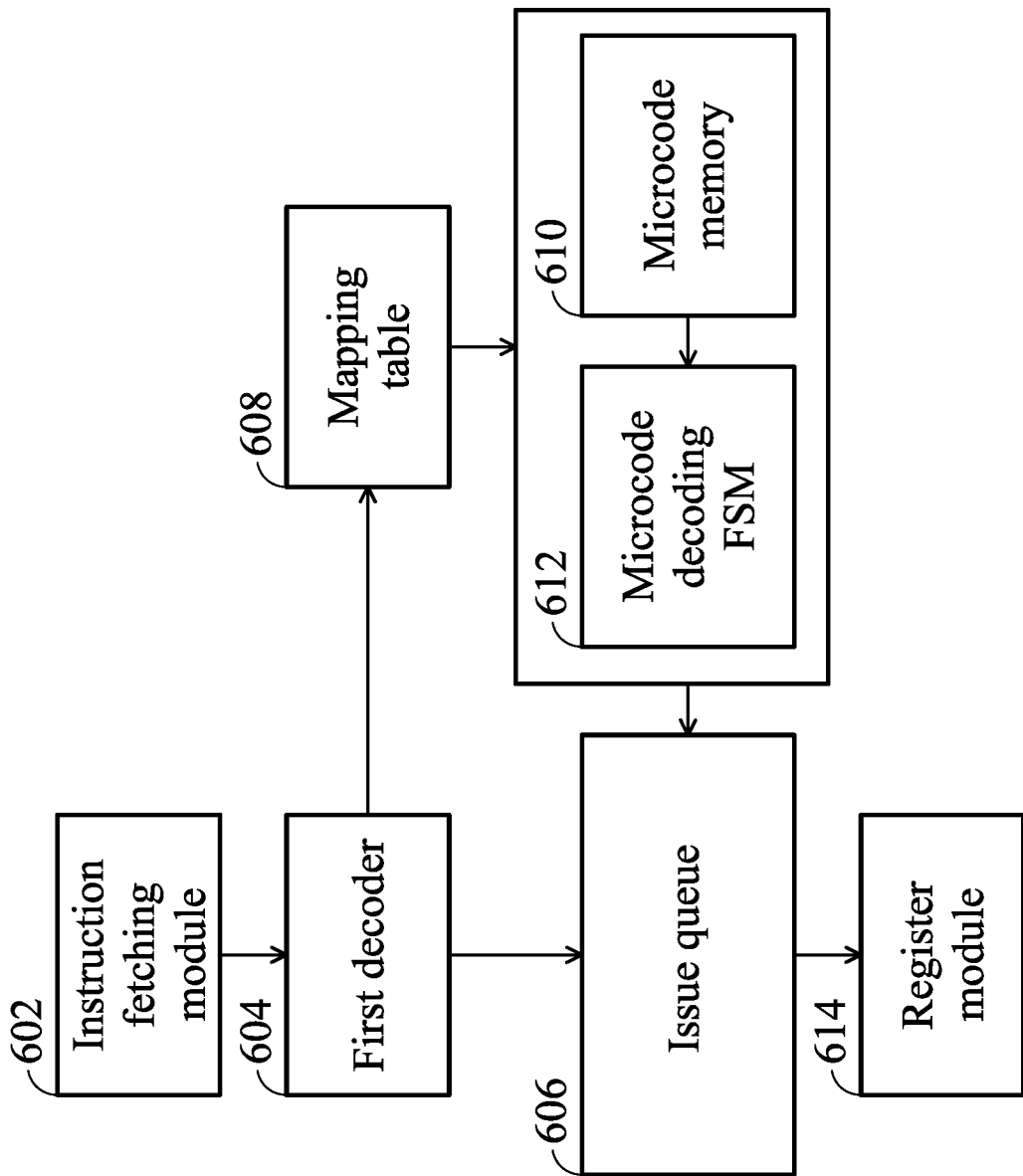
FIG. 6 is a block diagram illustrating a microprocessor 600 in accordance with an exemplary embodiment of the invention, which focuses on the technique of converting macroinstructions into microinstructions.

FIG. 6 is a block diagram illustrating a microprocessor 600 in accordance with an exemplary embodiment of the invention, which focuses on the technique of converting macroinstructions into microinstructions. An instruction fetched by an instruction fetching module 602 is sent to the first decoder 604 to determine whether a conversion from a macroinstruction to microinstructions is required. A simple instruction is decoded directly by the first decoder 604 and sent to the issue queue 606 waiting for execution. A complex instruction needs conversion from a macroinstruction into microinstructions. By checking a mapping table 608, an address on the microcode memory 610 corresponding to the complex instruction (i.e., the macroinstruction) is obtained. The contents at the address are retrieved from the microcode memory 610 and decoded into a plurality of microinstructions by a microcode decoding finite-state machine (FSM) 612. The microinstructions decoded from the microcode decoding FSM 612 are queued in the issue queue 606 waiting for execution. The microinstructions involve at least one microinstruction loop that is repeatedly performed by the datapath 102 to implement the request requested by the macroinstruction. As shown, the output from the issue queue 606 may be used to fill a register module 614. The register module 614 includes a plurality of registers which are referenced by the datapath 102. The length of the source operands indicated in the macroinstruction and the size of the input operands indicated in the converted microinstructions to operate the datapath 102 (e.g., the bit width (WL, FL) recorded in the register 104 of FIG. 1) may be recorded in the registers provided in the register module 614. In addition, the registers of the register module 614 may be responsible for the temporary storage of the intermediate calculation results of the macroinstruction. Another advantage brought by the microprocessor 600 of the invention that is adaptive to neural network computing is: a macroinstruction capable of high granularity operations is not limited to the physical bit width (e.g. the fixed 128 bits) of the microprocessor 600 because of the looking-up technique implemented based on the mapping table 608, the microcode memory 610 and the microcode decoding FSM 612. The operands of one macroinstruction may be vectors or matrices. For example, matrix multiplication may be performed by one macroinstruction with two 256*256 matrices as input operands (each element of the matrices is 16-bits long). The complexity of the neural network programming is greatly simplified. When the hardware design of the datapath 102 is changed, only the microinstructions stored in the microcode memory 610 have to be modified and there is no need to modify the macroinstructions.

Figure 7:
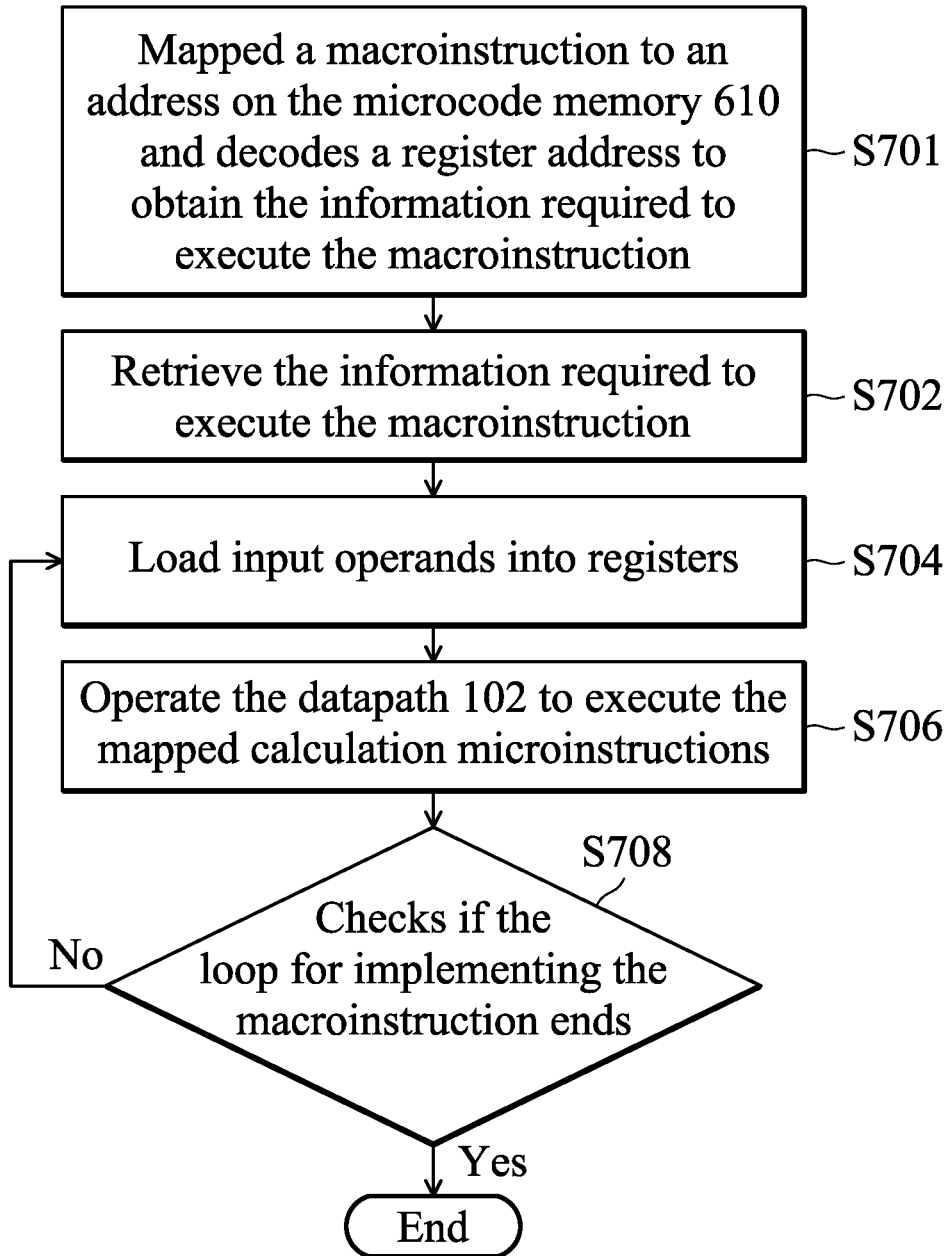
FIG. 7 is a flowchart depicting how the microcode decoding FSM 612 operates according to a macroinstruction and how the correspondingly decoded microinstructions are executed in accordance with an embodiment of the invention.

FIG. 7 is a flowchart depicting how the microcode decoding FSM 612 operates according to a macroinstruction and how the correspondingly decoded microinstructions are executed in accordance with an embodiment of the invention. Step S701 is performed by the microcode decoding FSM 612. By looking up the mapping table 608, a macroinstruction is mapped to an address on the microcode memory 610. The microcode decoding FSM 612 decodes the information required to execute the macroinstruction, including an address of the register module 614 which is allocated to temporarily store the size of the source operands indicated by the macroinstruction and the size of input operands of calculations requested by the macroinstruction. The register module 614 may be implemented by architecture registers of the microprocessor 600. In an exemplary embodiment, the source operand is a third-order tensor, which may also be known as a three-dimensional matrix that is in a size defined by a length, a width, and a depth of the three-dimensional matrix. The input operands are the elements in the three-dimensional matrix and the size of input operand is the element size of the three-dimensional matrix. Based on the size of input operand, the microcode decoding FSM 612 divides the source operand into a plurality of input operands. The size of input operand depends on the bit width of the datapath 102 (e.g., the bit width (WL, FL) stored in the register 104 of FIG. 1). The invention is not limited to such a dynamically adjustable design of the bit width (WL, FL). In other exemplary embodiments, the bit width is specified by the macroinstruction during the programming. In step S702, parts of the microinstructions obtained from the microcode memory 610 corresponding to the macroinstruction are executed to retrieve the information about the macroinstruction based on an address of the register module 614 decoded in step S701. Based on the information retrieved in step S702 for execution of the macroinstruction, parts of the microinstructions obtained from the microcode memory 610 corresponding to the macroinstruction are repeated as a loop, by which steps S704-S708 are repeated. In step S704, input operands are loaded into registers (or other storage space) by at least one loading microinstruction. In step S706, the datapath 102 operates according to at least one calculation microinstruction. By step S706, the calculation microinstructions currently operating the datapath 102 may be associated to the calculation microinstructions previously operating the datapath 102. Step S708 checks if the loop ends. A macroinstruction is executed by repeatedly operating the datapath 102.

A calculation of tensor addition is discussed in this paragraph as an example. A tensor addition with great granularity requested by a macroinstruction may be divided into multiple parts to be implemented by repeating a microinstruction that is designed to perform an addition calculation. The datapath 102 includes an arithmetic logic unit (ALU) that operates according to the addition microinstructions. The size of input operands of the addition microinstruction depends on the SIMD width of the arithmetic logic unit (ALU), and zeros are filled into the input operands to match the SIMD width. In step S702, the tensor size and the source addresses of operands indicated by the macroinstruction are acquired (e.g., from the architecture registers). By repeating steps S704 to S708, the datapath 102 is repeatedly operated to perform the plurality of addition microinstructions to achieve the tensor addition.

A calculation of tensor multiplication is discussed in this paragraph as an example. A tensor multiplication requested by a macroinstruction may be divided into multiple parts to be implemented by a plurality of multiply-and-accumulate microinstructions (which may be in the format depicted in FIG. 5). The datapath 102 includes an arithmetic logic unit (ALU) that operates according to the multiply-and-accumulate microinstructions. In step S702, the tensor size, the source address of operands and the operand size indicated by the macroinstruction are acquired. Taking a three-dimensional matrix as an example, the tensor size is defined by a length, a width and a depth of the three-dimensional matrix. The operand size is defined as the size of the maximum element of the three-dimensional matrix, e.g. 16 bits. By repeating steps S704 to S708, the datapath 102 is repeatedly operated to perform the plurality of multiply-and-accumulate microinstructions to achieve the tensor multiplication.

Figure 8:
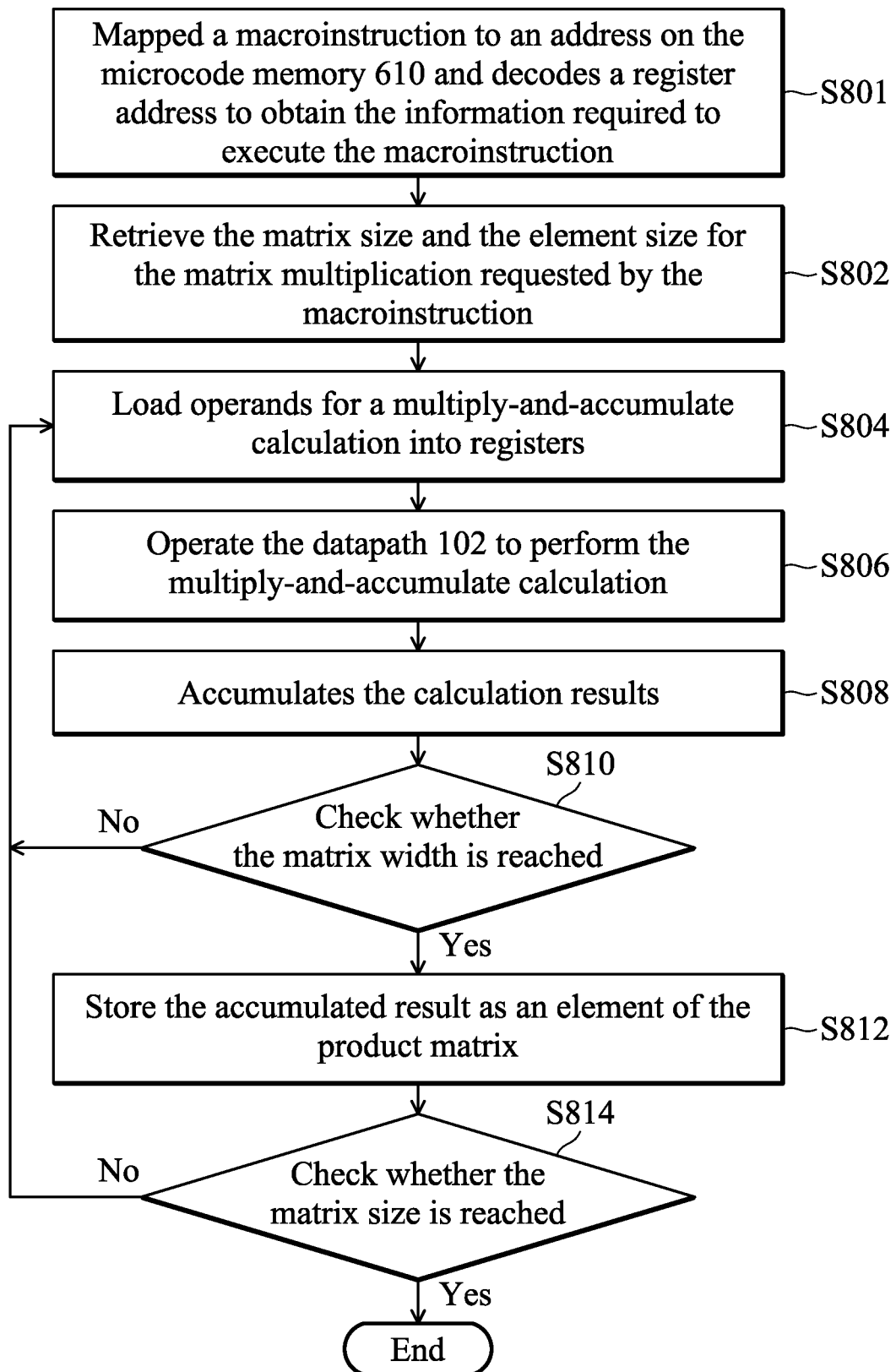
FIG. 8 is a flowchart depicting how the multiplication of the second-order tensors (matrices) is achieved by a plurality of microinstructions in accordance with an exemplary embodiment of the invention.

FIG. 8 is a flowchart depicting how the multiplication of the second-order tensors (matrices) is achieved by a plurality of microinstructions in accordance with an exemplary embodiment of the invention. Step S801 is performed by the microcode decoding FSM 612. By looking up the mapping table 608, a macroinstruction requesting a tensor multiplication is mapped to an address on the microcode memory 610. The microcode decoding FSM 612 decodes the macroinstruction to get information required to execute the macroinstruction. The information includes an address of the register module 614, for reading the register module 614 to get registered information including the width and depth of the source matrices and the maximum element size of the source operands. The register module 614 may be implemented by architecture registers of the microprocessor 600. In step S802, parts of the microinstructions obtained from the microcode memory 610 corresponding to the macroinstruction are executed to retrieve, based on an address of the register module 614 decoded from step S801, the matrix size and the element size for the matrix multiplication requested by the macroinstruction. Then, parts of the microinstructions obtained from the microcode memory 610 corresponding to the macroinstruction are repeated as a loop, wherein steps S804-S814 are repeated to achieve the matrix multiplication by a plurality of multiply-and-accumulate calculations. In step S804, operands for the current multiply-and-accumulate calculation are loaded into registers. In step S806, the datapath 102 operates to perform the multiply-and-accumulate calculation. Step S808 accumulates the calculation results. Step S810 checks whether the matrix width is reached. If not, steps S804 to S808 are performed again. If yes, step S812 is performed to store the accumulated result as an element of the product matrix. Step S814 checks whether the matrix size is reached. If not, steps S804 to S812 are repeated until all elements of the product matrix are calculated. When reaching the matrix size, the matrix multiplication requested by one macroinstruction is completed. A macroinstruction calculating a product matrix C by multiplication of two matrices A and B each containing 256*256 elements is discussed as an example. Each element of the matrices A and B may be 16 bits. The physical bit width of the datapath 102 may be 128 bits. The multiply-and-accumulate unit provided in the datapath 102 may multiply-and-accumulate eight matrix elements of A and eight matrix elements of B each time. The multiply-and-accumulate microinstruction (referring to the format shown in FIG. 5) that operates the datapath 102 in step S806 may be:

macc WLFL0, WLFL1, C[i][j], A[i][k++], B[j][k++], which multiply-and-accumulate eight matrix elements of A and eight matrix elements of B. In step S808, the multiply-and-accumulate result of step S806 is accumulated to the former multiply-and-accumulate results. In step S810, it is determined whether 256 elements are multiplied and accumulated. If yes, the flow proceeds to step S812 (note that in the embodiment, the inner loop S804 to S808 is repeated 32 times), and the accumulated result of S808 is output as a matrix element of the product matrix C. In step S814, it is determined whether the matrix width of A (256) and the matrix height of B (256) are reached. If not, steps S804 to S812 are repeatedly executed until all 256*256 elements of the product matrix C are calculated.

The conversion architecture (from a macroinstruction to microinstructions (μops)) proposed in this invention does not require a complicated compiler. In particular, each product generation can use the same simple macroinstructions, which save the instruction memory space, maintains the compatibility between the different product generations, and is conducive to establish and manage the software development environment for a microprocessor capable of neural network computing.

The hardware design of the arithmetic logic unit of the datapath 102 is described below, which provides an adaptive word length WL. In a neural network computing, multiplication and dot production are massively performed on short length (e.g. short WL) data. For example, the weighting values used in the neural network are typically 1 or 2 bits wide. The multiplication execution unit of the datapath 102 is specially designed for the multiplication of the dynamically changed word length WL. The word length WL of the multiplier and multiplicand numbers indicated in a multiplication microinstruction may be as low as 4 bits, 2 bits or 1 bit.

Figure 9:
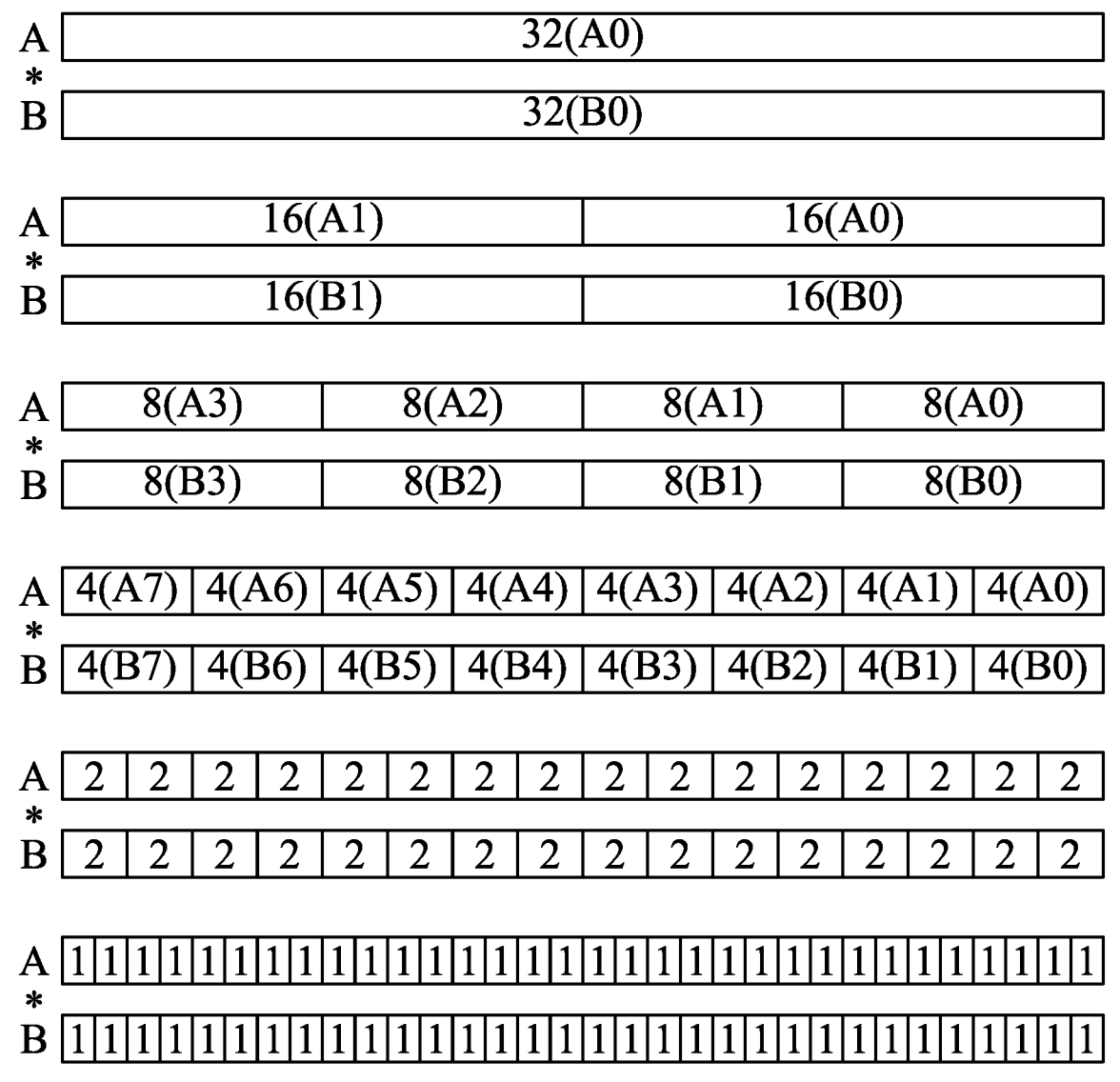

FIG. 9 uses different word lengths (WL) to illustrate the operands acquired from A and B indicated in the microinstruction (μop) format of FIGS. 5. A and B each is 32 bits long. When the word length (WL) is 32 bits, field "A" indicates a 32-bit data A0 as a multiplicand number, and field "B" indicates a 32-bit data B0 as a multiplier number. When the word length (WL) is 16 bits, field "A" indicates two 16-bit multiplicand numbers (A1, A0), and field "B" indicates two 16-bit multiplier numbers (B1, B0). When the word length (WL) is 8 bits, field "A" indicates four 8-bit multiplicand numbers (A3, A2, A1, A0), and field "B" indicates four 8-bit multiplier numbers (B3, B2, B1, B0). When the data bit width (WL) is 4 bits, field "A" indicates eight 4-bit multiplicand numbers A7 . . . A0, and the field "B" indicates eight 4-bit multiplier numbers B7 . . . B0. When the word length (WL) is 2 bits, fields "A" and "B" each indicate sixteen 2-bit numbers (as the multiplicand/multiplier numbers). When the word length (WL) is 1 bit, fields "A" and "B" each indicate thirty-two 1-bit numbers (as the multiplicand/multiplier numbers). The datapath 102 of the invention use adaptive word length to perform calculations on the operands retrieved from A and B.

Figure 10:
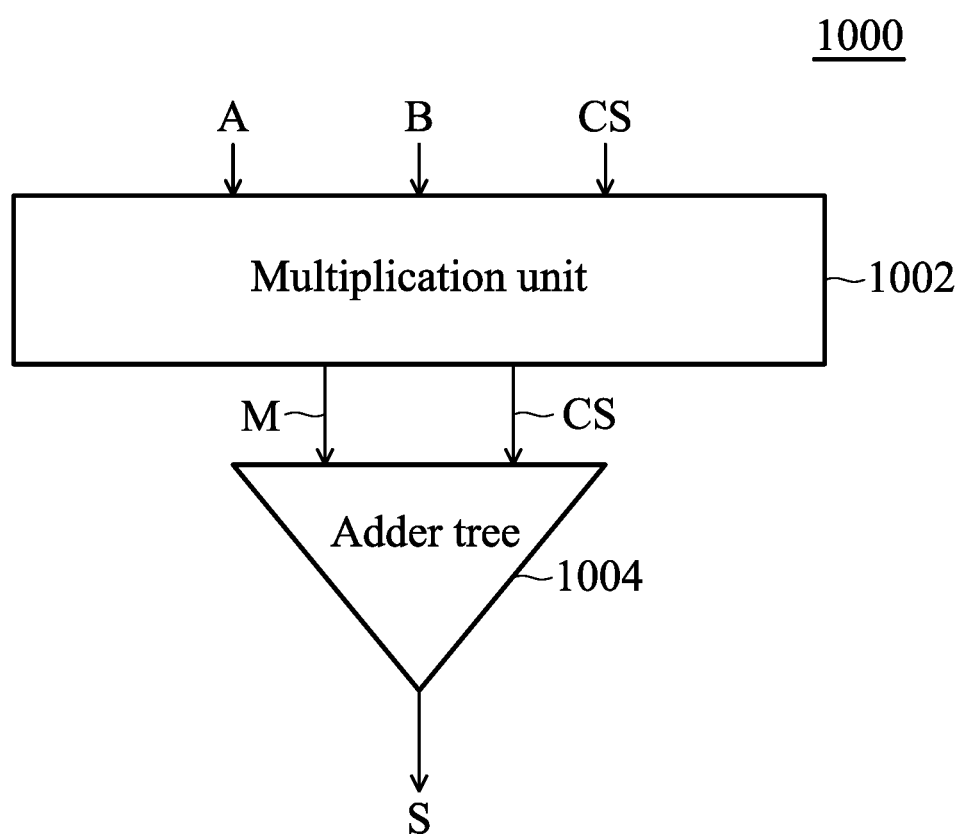
FIG. 10 depicts a datapath 1000 for a multiply-and-accumulate calculation in accordance with an embodiment of the invention.
Figures 1, 12A:
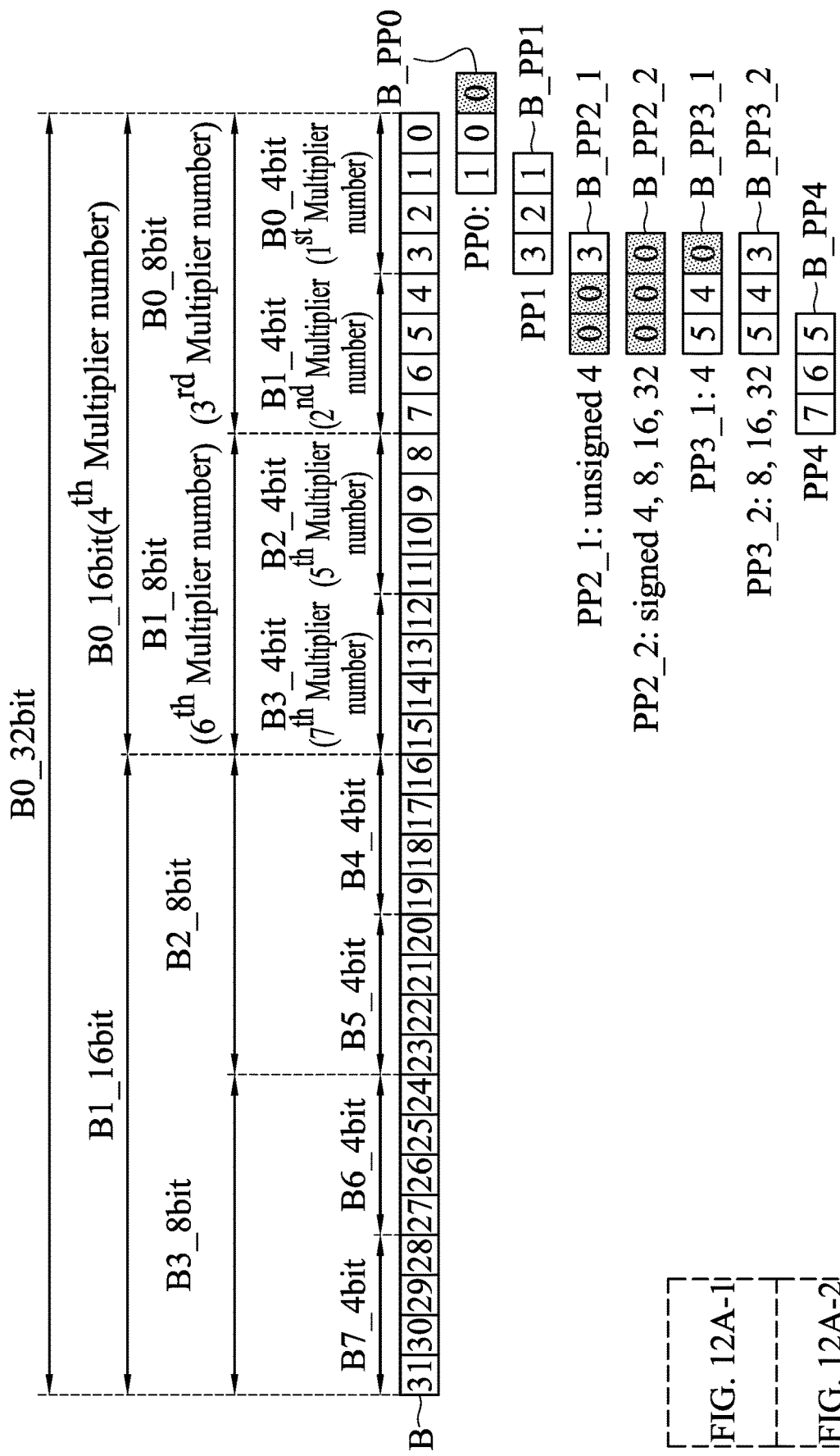
Figures 1, 12B:
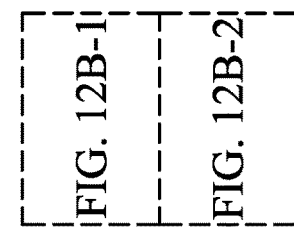

FIG. 10 depicts a datapath 1000 for a multiply-and-accumulate calculation in accordance with an embodiment of the invention, which includes a multiplication unit 1002 and an adder tree 1004. A control signal CS is provided to set the word length WL and indicate whether the calculations are signed or unsigned. The word length WL can be set according to the bit width recorded in the register 104 of FIG. 1 or indicated in a microinstruction. The signed/unsigned calculation may be selected based on the bit width recorded in the register 104, or be set through a specific register or indicated in a microinstruction. The multiplication unit 1002 and the adder tree 1004 operate in accordance with the control signal CS. The multiplication unit 1002 outputs data M, which is formed by the digital bits of all of the calculated products. The adder tree 1004 adds the products acquired from the data M, and output data S. FIG. 11 shows an example in which the word length WL is 8 bits, and the data M and S calculated from the multiply-and-accumulate calculation are shown. The data M includes 4 products M0 . . . M3. The data S is an accumulated result of the four products M0 . . . M3.

The invention specifically discloses an exemplary embodiment of the multiplication unit 1002 which performs Booth multiplication. The digital bits representing a multiplier number Bi (one of the multiplier numbers B0 . . . Bm acquired from the multiplier number supply data "B") is segmented (with overlaps) as multiple sets of three bits. Comparing the successive two sets of three bits $b_{n+1}b_nb_{n-1}$ and $b_{n+3}b_{n+2}b_{n+1}$, there is an overlapped bit, $b_{n+1}$. When less than three bits are available, "0" is combined with the acquired one or two bits to form three bits. A table for Booth multiplication is:

| $b_{n+1}b_nb_{n-1}$ | PP |
|---|---|
| 000 | +0*Ai |
| 001 | +1*Ai |
| 010 | +1*Ai |
| 011 | +2*Ai (shift 1 bit to the left) |
| 100 | −2*Ai (shift 1 bit to the left and then invert the digits) |
| 101 | −1*Ai (invert the digits) |
| 110 | −1*Ai |
| 111 | −0*Ai |

Ai is one of the multiplicand number A0 . . . Am acquired from field "A". Three bits, e.g. $b_{n+1}b_nb_{n-1}$, are acquired from a multiplier number Bi to determine what operation is performed on the multiplicand number Ai and thereby a partial product PP is calculated. By shifting and adding, a multiplication result Ai*Bi (i.e. Mi) is calculated from the collected partial products PP. After accumulating the digital bits of Mi, data M is generated.

FIGS. 12A-1, 12A-2, 12B-1, and 12B-2 depict the 3-bit acquisition, $b_{n+1}b_nb_{n-1}$, of B for the various word lengths WL. Data B includes bits $b_0$~$b_{31}$ (represented by numbers 31 to 0 in the figures). The filled "0" is represented by inked background. The number on the non-inked background represents the bit number of data B, for a copy of the corresponding bit.

This paragraph discusses an example where the word length WL is 4 bits. A four-bit multiplier number B0_4bit is acquired from bits 0 to 3 of data B (which is named the first multiplier number in FIG. 12-A, including bits $b_3$, $b_2$, $b_1$ and $b_0$ of B). By performing the aforementioned 3-bit acquisition on the four-bit multiplier number B0_4bit, B_PP0, B_PP1, and B_PP2_1 (for unsigned calculations, or B_PP2_2 for signed calculations), each containing three bits, are obtained. A four-bit multiplier number B1_4bit is acquired from bits 4 to 7 of data B (which is named the second multiplier number in FIG. 12-A, including bits $b_7$, $b_6$, $b_5$ and $b_4$ of B). By performing the aforementioned 3-bit acquisition on the four-bit multiplier number B1_4bit, B_PP3_1, B_PP4, and B_PP5_1 (for unsigned calculations, or B_PP5_2 for signed calculations), each containing three bits, are obtained. A four-bit multiplier number B2_4bit is acquired from bits 8 to 11 of data B (which is named the fifth multiplier number in FIG. 12-A, including bits $b_{11}$, $b_{10}$, $b_9$ and $b_8$ of B). By performing the aforementioned 3-bit acquisition on the four-bit multiplier number B2_4bit, B_PP6_1, B_PP7, and B_PP8_1 (for unsigned calculations, or B_PP8_2 for signed calculations), each containing three bits, are obtained. A four-bit multiplier number B3_4bit is acquired from bits 12 to 15 of data B (which is named the seventh multiplier number in FIG. 12-A, including bits $b_{15}$, $b_{14}$, $b_{13}$ and $b_{12}$ of B). By performing the aforementioned 3-bit acquisition on the four-bit multiplier number B3_4bit, B_PP9_1, B_PP10, and B_PP11_1 (for unsigned calculations, or B_PP11_2 for signed calculations), each containing three bits, are obtained. The subsequent four-bit multiplier numbers B4_4bit (acquired from bits 16 to 19 of data B), B5_4bit acquired from bits 20 to 23 of data B), B6_4bit (acquired from bits 24 to 27 of data B), and B7_4bit (acquired from bits 28 to 31 of data B) are acquired similarly. Regarding the multiplier numbers B0_4bit, B1_4bit, B2_4bit, and B3_4bit, B_PP0, B_PP3_1, B_PP6_1 and B_PP9_1 are the starting acquisition, B_PP1, B_PP4, B_PP7 and B_PP10 are the middle acquisition, B_PP2_1, B_PP5_1, B_PP8_1 and B_PP11_1 are the unsigned ending acquisition, and B_PP2_2, B_PP5_2, B_PP8_2 and B_PP11_2 are the signed ending acquisition.

This paragraph discusses an example where the word length WL is 8 bits. An 8-bit multiplier number B0_8bit is acquired from bits 0 to 7 of data B (which is named the third multiplier number in FIG. 12-A, including bits $b_7$, $b_6$ . . . $b_0$ of B). By performing the aforementioned 3-bit acquisition on the 8-bit multiplier number B0_8bit, B_PP0, B_PP1, B_PP3_2, B_PP4, and B_PP5_1 (for unsigned calculations, or B_PP5_2 for signed calculations) are obtained. An 8-bit multiplier number B1_8bit is acquired from bits 8 to 15 of data B (which is named the sixth multiplier number in FIG. 12-A, including bits $b_{15}$, $b_{14}$ . . . $b_8$ of B). By performing the aforementioned 3-bit acquisition on the 8-bit multiplier number B1_8bit, B_PP6_1, B_PP7, B_PP9_2, B_PP10, and B_PP11_1 (for unsigned calculations, or B_PP11_2 for signed calculations) are obtained. The subsequent 8-bit multiplier numbers B2_8bit (acquired from bits 16 to 23 of data B) and B3_8bit acquired from bits 24 to 31 of data B) are acquired similarly. B_PP0 and B_PP6_1 are the starting acquisition of the multiplier numbers B0_8bit and B1_8bit, respectively. B_PP1, B_PP3_2, and B_PP4 are the middle acquisition of the multiplier number B0_8bit. B_PP7, B_PP9_2, and B_PP10 are the middle acquisition of the multiplier number B1_8bit. B_PP5_1 and B_PP11_1 are the unsigned ending acquisition of the multiplier numbers B0_8bit and the B1_8bit, respectively. B_PP5_2 and B_PP11_2 are the signed ending acquisition of the multiplier numbers B0_8bit and the B1_8bit, respectively.

This paragraph discusses an example where the word length WL is 16 bits. A 16-bit multiplier number B0_16bit is acquired from bits 0 to 15 of data B (which is named the fourth multiplier number in FIG. 12-A, including bits $b_{15}$, $b_{14} \ldots b_0$ of B). By performing the aforementioned 3-bit acquisition on the 16-bit multiplier number B0_16bit, B_PP0, B_PP1, B_PP3_2, B_PP4, B_PP6_2, B_PP7, B_PP9_2, B_PP10, and B_PP11_1 (for unsigned calculations, or B_PP11_2 for signed calculations) are obtained. The subsequent 16-bit multiplier number B1_16bit (acquired from bits 16 to 31 of data B) is acquired similarly. Regarding the multiplier number B0_16bit, B_PP0 is the starting acquisition, B_PP1, B_PP3_2, B_PP4, B_PP6_2, B_PP7, B_PP9_2, and B_PP10 are the middle acquisition, B_PP11_1 is the unsigned ending acquisition, and B_PP11_2 is the signed ending acquisition.

This paragraph discusses an example where the word length WL is 32 bits. A 32-bit multiplier number B0_32bit is acquired from bits 0 to 31 of data B (including bits $b_{31}$, $b_{30} \ldots b_0$ of B). By performing the aforementioned 3-bit acquisition on the 32-bit multiplier number B0_32bit, B_PP0, B_PP1, B_PP3_2, B_PP4, B_PP6_2, B_PP7, B_PP9_2, B_PP10, B_PP12_2, B_PP13, B_PP15_2, B_PP16, B_PP18_2, B_PP19, B_PP21_2, B_PP22, and B_PP23_1 (for unsigned calculations, or B_PP23_2 for signed calculations) are obtained. Regarding the multiplier number B0_32bit, B_PP0 is the starting acquisition, B_PP1, B_PP3_2, B_PP4, B_PP6_2, B_PP7, B_PP9_2, B_PP10, B_PP12_2, B_PP13, B_PP15_2, B_PP16, B_PP18_2, B_PP19, B_PP21_2, B_PP22 are the middle acquisition, B_PP23_1 is the unsigned ending acquisition, and B_PP23_2 is the signed ending acquisition.

Considering that the word length WL is variable, multiplex selection is used to select between the large numbers of 3-bit acquisition. For example, the three bits get by the starting acquisition of the second multiplier number obtained from the operand B in the first word length and the three bits get by a middle acquisition of the first multiplier number obtained from the operand B in the second word length may be selected by a multiplexer. The first word length may be 4 bits. The second multiplier number obtained from the operand B in 4 bits may be B1_4bit and, by a starting acquisition, B_PP3_1 is obtained. The second word length may be 8, 16 or 32 bits and the first multiplier number may be B0_8bit, B0_16bit and B0_32bit. The three bits B_PP3_2 get by middle acquisition of B0_8bit, B0_16bit or B0_32bit and the three bits B_PP3_1 get by the starting acquisition of B1_4bit may be selected by a multiplexer. As shown, the acquisition of B_PP3_2 and the acquisition of B_PP3_1 are aligned.

Referring to the three bits with all zeros (e.g., B_PP2_2, B_PP5_2, B_PP8_2, B_PP11_2), they may be selected at the boundary of two multiplier numbers, e.g., selected as a signed ending acquisition. For example, B_PP2_2 may be selected at the boundary of 4-bit multiplier numbers B0_4bit and B1_4bit as a signed ending acquisition of B0_4bit. B_PP5_2 may be selected at the boundary of 4-bit multiplier numbers B1_4bit and B2_4bit as a signed ending acquisition of B1_4bit, or may be also selected at the boundary of 8-bit multiplier numbers B0_8bit and B1_8bit as a signed ending acquisition of B0_8bit. The all-zero three bits may also be selected for pseudo acquisition at the non-boundary positions. For example, B_PP2_2 may be selected as one middle acquisition of the 8-bit multiplier number B0_8bit, 16-bit multiplier number B0_16bit, or 32-bit multiplier number B0_32bit. B_PP5_2 may be selected as one middle acquisition of the 16-bit multiplier number B0_16bit or 32-bit multiplier number B0_32bit. Such an all-zero 3-bit number may be an option to be selected by a multiplexer while another input is an unsigned ending acquisition for another word length WL. For example, B_PP2_2 may be an option to be selected by a multiplexer while another multiplexer input is B_PP2_1 (an unsigned ending acquisition for a 4-bit multiplier number B0_4bit). As shown, the acquisition of B_PP2_2 and the acquisition of B_PP2_1 are aligned.

The 3-bit acquisition from data B according to FIGS. 12A-1, 12A-2, 12B-1 and 12B-2 may be temporarily stored in registers for execution of Booth multiplication. According to all the possible 3-bit digits acquired from data B, the multiplication unit 1002 performs Booth multiplication on the multiplicand numbers A0 . . . Am to calculates partial products (PP). The multiplication unit 1002 further performs shifting and adding on the partial products (PP) to get products M0 . . . Mm to be combined as data M. When the datapath 1000 simply performs multiplication Ai*Bi, the datapath 1000 outputs M (combined from the products M0 . . . Mm) directly. When the datapath 1000 is a multiply-and-accumulate unit, after the multiplication Ai*Bi generates the products Mi, the adder tree 1004 accumulates the products Mi to generate an output S.

Figure 13:
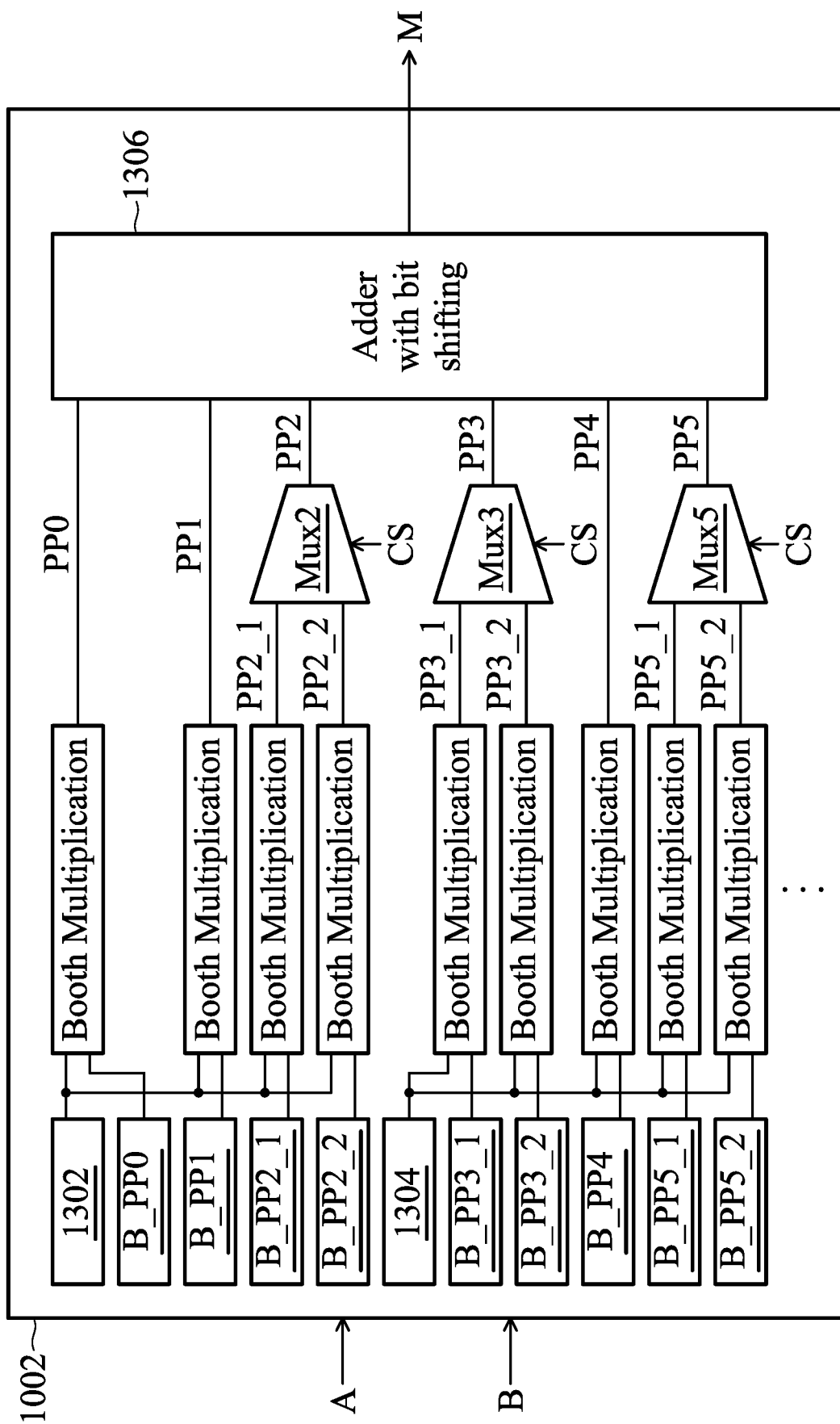
FIG. 13 depicts the hardware architecture of multiplication unit 1002 in accordance with an embodiment of the invention.

FIG. 13 depicts the hardware architecture of the multiplication unit 1002 in accordance with an embodiment of the invention. Every 3-bit acquisition acquired from the operand B (multiplier number supply data) is stored to a corresponding register (same labels as data). Only a portion is presented in the figure, including B_PP0, B_PP1, B_PP2_1, B_PP2_2, B_PP3_1, B_PP3_2, B_PP4, B_PP5_1, B_PP5_2. The operand A (multiplicand number supply data) is segmented according to the word length WL and stored to registers (only registers 1302 and 1304 are shown in the figure). For example, when the word length WL is 4, the digital bits, numbered from 0 to 31, of A are divided into eight multiplicand numbers A0_4bit, A1_4bit . . . . A7_4bit and stored to registers (e.g. the register 1302 for the multiplicand number A0_4bit and the register 1304 for the multiplicand number A1_4bit). When the word length WL is 8, the digital bits, numbered from 0 to 31, of A are divided into four multiplicand numbers A0_8bit, A1_8bit and A7_8bits and stored to registers (e.g. the register 1302 for the multiplicand number A0_8bit and the register 1304 for the multiplicand number A1_8bit). When the word length WL is 16, the digital bits, numbered from 0 to 31, of A are divided into two multiplicand numbers A0_16bit and A1_16bits and stored to registers (e.g. the register 1302 for the multiplicand number A0_16bit and the register 1304 for the multiplicand number A1_16bit). When the word length WL is 32, the digital bits, numbered from 0 to 31, of A form a multiplicand number A0_32bit and stored to a register (e.g. the register 1302 storing the multiplicand A0_32bit). The multiplication unit 1002 further includes a partial product selection circuit which includes a plurality of multiplexers. When the operand B (to be divided into multiplier numbers) and the operand A (to be divided into multiplicand numbers) both are 32 bits, the partial product selection circuit includes 15 multiplexers Mux2, Mux3, Mux5 . . . Mux23 (only Mux2, Mux3, and Mux5 shown in FIG. 13).

When the word length WL is 4 bits, the register 1302 stores the multiplicand number A0_4bit and the register 1304 stores the multiplicand number A1_4bit. After performing Booth multiplication on the multiplicand number A0_4bit based on B_PP0, B_PP1, B_PP2_1 and B_PP2_2, values PP0, PP1, PP2_1 and PP2_2 are calculated. When the control word CS indicates that the word length WL is 4 bits and an unsigned calculation is requested, the multiplexer Mux2 outputs PP2_1 as the partial product PP2. When the control word CS indicates that the word length WL is 4 bits and a signed calculation is requested, the multiplexer Mux2 outputs PP2_2 as the partial product PP2. The partial products PP0, PP1, and PP2 are properly shifted and added and thereby a product M0 is calculated. After performing Booth multiplication on the multiplicand number A1_4bit based on B_PP3_1, B_PP3_2, B_PP4, B_PP5_1, and B_PP5_2, values PP3_1, PP3_2, PP4, PP5_1 and PP5_2 are calculated. When the control word CS indicates that the word length WL is 4 bits and an unsigned calculation is requested, the multiplexer Mux3 outputs PP3_1 as the partial product PP3 and the multiplexer Mux5 outputs PP5_1 as the partial product PP5. When the control word CS indicates that the word length WL is 4 bits and a signed calculation is requested, the multiplexer Mux3 still outputs PP3_1 as the partial product PP3 but the multiplexer Mux5 outputs PP5_2 as the partial product PP5. The partial products PP3, PP4, and PP5 are properly shifted and added and thereby a product M1 is calculated. Similar hardware architectures may be provided to get the products M2 . . . M7. M0=A0_4bit*B0_4bit, M1=A1_4bit*B1_4bit, M2=A2_4bit*B2_4bit M7=A7_4bit*B7_4bit. The digital bits of the products M0 . . . M7 are combined to form digital data M to be output by the multiplication unit 1002. The adder 1306 with bit shifting shifts and adds the partial products PP to obtain the products M0 . . . M7 and form the digital data M.

When the word length WL is 8 bits, the registers 1302 and 1304 both store a multiplicand number A0_8bit. After performing Booth multiplication on the multiplicand number A0_8bit based on B_PP0, B_PP1, B_PP2_1, B_PP2_2, B_PP3_1, B_PP3_2, B_PP4, B_PP5_1, and B_PP5_2, values PP0, PP1, PP2_1, PP2_2, PP3_1, PP3_2, PP4, PP5_1, and PP5_2 are calculated. When the control word CS indicates that the word length WL is 8 bits, the multiplexer Mux2 outputs PP2_2 as the partial product PP2 and the multiplexer Mux3 outputs PP3_2 as the partial product PP3 no matter a signed or unsigned calculation is requested. When the control word CS indicates that the word length WL is 8 bits and an unsigned calculation is requested, the multiplexer Mux5 outputs PP5_1 as the partial product PP5. When the control word CS indicates that the word length WL is 8 bits and a signed calculation is requested, the multiplexer Mux5 outputs PP5_2 as the partial product PP5. The partial products PP0, PP1, PP2, PP3, PP4, and PP5 are properly shifted and added and thereby a product M0 is calculated. Note that PP2 is 0 (PP2 must be 0 when the word length WL is 8/16/32 bits) and is aligned to and added to PP3. Similar hardware architectures may be provided to get the products M1 . . . M3. M0=A0_8bit*B0_8bit, M1=A1_8bit*B1_8bit, M2=A2_8bit*B2_8bit, and M3=A3_8bit*B3_8bit. The digital bits of the products M0 . . . M3 are combined to form digital data M to be output by the multiplication unit 1002. The adder 1306 with bit shifting shifts and adds the partial products PP to obtain the products M0 . . . M3 and form the digital data M.

The aforementioned hardware architecture may be also used for other longer word lengths WL (e.g., 16, 32 bits). As for the shorter word length WL (e.g., 2 bits or 1 bit), the 3-bit acquisition of the operand B for Booth multiplication cannot be performed. A mapping table is used rather than the aforementioned hardware implementing Booth multiplication. By using the aforementioned hardware architecture and the mapping table, the multiplication unit 1002 is adaptive to various word lengths WL (32/16/8/4/2/1 bits). When the bit width adjuster 108 of FIG. 1 dynamically adjusts the word length WL, the multiplication unit 1002, adaptive to various word lengths WL (32/16/8/4/2/1 bits), provided by the datapath 1000 of FIG. 10 can work normally.

In an exemplary embodiment, a microprocessor including the multiplication unit 1002 of FIG. 13 uses a plurality of acquisition registers and a partial product selection circuit. Three specific acquisition registers are discussed in this paragraph. For a first word length (e.g., 4 bits), a first acquisition register temporarily stores an unsigned ending acquisition of a first multiplier number carried in a multiplier number supply data, and a third acquisition register temporarily stores a starting acquisition of a second multiplier number carried in the multiplier number supply data. For a second word length (e.g., 8 bits) longer than the first word length, a fourth acquisition register temporarily stores a middle acquisition of a third multiplier number carried in the multiplier number supply data. The multiplier number supply data may be the operand B. The first multiplier number may be B0_4bit, and the unsigned ending acquisition may be B_PP2_1 ("0, 0, $b_3$"). The second multiplier number may be B1_4bit, and the starting acquisition may be B_PP3_1 ("$b_5$, $b_4$, 0"). The third multiplier number may be B0_8bit, and the middle acquisition may be B_PP3_2 ("$b_5$, $b_4$, $b_3$"). The middle acquisition B_PP3_2 ("$b_5$, $b_4$, $b_3$") may be combined from the unsigned ending acquisition B_PP2_1 ("0, 0, $b_3$") of the first multiplier number B0_4bit and the starting acquisition B_PP3_1 ("$b_5$, $b_4$, 0") of the second multiplier number B1_4bit. In the first word length (e.g. 4 bits), the partial product selection circuit sets a third partial product (e.g. PP3) to be a value (e.g. PP3_1) calculated by using the Booth multiplication to process the multiplicand number (e.g. A1_4bit) corresponding to the second multiplier number (e.g. B1_4bit) based on the three bits (e.g. B_PP3_1) stored in the third acquisition register. In the second word length (e.g. 8 bits), the partial product selection circuit sets a third partial product (e.g. PP3) to be a value (e.g. PP3_2) calculated by using the Booth multiplication to process the multiplicand number (e.g. A0_8bit) corresponding to the third multiplier number (e.g. B0_8bit) based on the three bits (e.g. B_PP3_2) stored in the third acquisition register.

Figure 14:
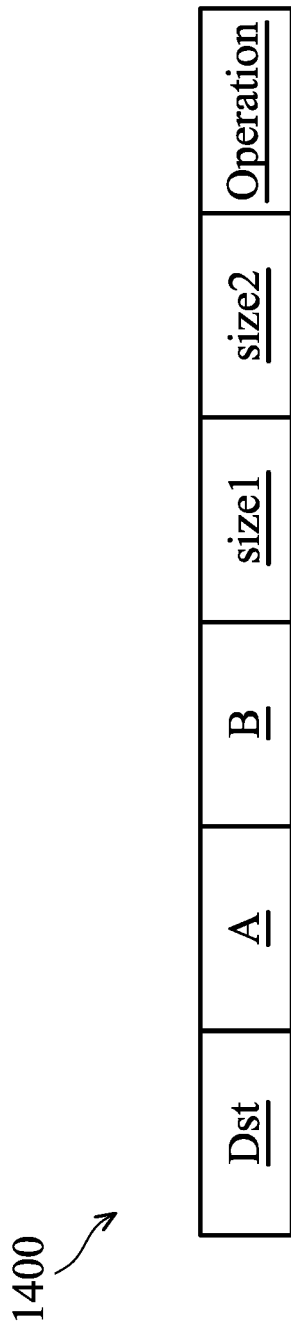
FIG. 14 illustrates a microinstruction (which may be an SIMD microinstruction) 1400 executed by datapath 1000 in accordance with an exemplary embodiment of the invention.

FIG. 14 illustrates a microinstruction (which may be an SIMD microinstruction) 1400 executed by the datapath 1000 in accordance with an exemplary embodiment of the invention. The field "Dst" is designed for a destination operand, indicating the space (a register or memory) to store the calculation result. Fields "A" and "B" are designed for source operands that indicate the source of the multiplicand number supply data A and the multiplier number supply data B and, accordingly, the multiplicand number supply data A and the multiplier number supply data B are read from a register or memory. The field "size1" is designed to indicate the physical bit width of the datapath 1000 (i.e., the SIMD bit width, for example, 128 bits), which also determines the length of the data A and B. The field "size2" is designed to indicate the word length WL (for example, 32/16/8/4/2/1 bits) of each input operand (multiplicand/multiplier number) acquired from data A and B. The field "Operation" is designed to set the calculations to be signed or unsigned. The field "Operation" may be further designed to set the datapath 1000 to perform multiplications or multiply-and-accumulate calculations to determine that the adder tree 1004 is disabled or enabled to process the output M from the multiplication unit 1002. Of course, if the word length WL could be dynamically adjusted by the bit width adjuster 108 of FIG. 1, the field "size2" may be modified by "WLFLin" and "WLFLout" of FIG. 5 which are designed to indicate the register addresses of the bit width WL.

The datapath 1000 gets Booth multiplier numbers (3-bit acquisition) from the multiplier number supply data B. The datapath 1000 further divides the multiplicand number supply data A into a plurality of multiplicand numbers Ai and divides the multiplier number supply data B into a plurality of multiplier numbers Bi according to the word length WL. Booth multiplication is performed on the multiplicand numbers Ai and the Booth multiplier acquisitions to generate partial products PP0, PP1, PP2_1, PP2_2, PP3_1, PP3_2, etc. According to the word length WL, the datapath 1000 selects the proper part of the partial products PP2_1, PP2_2, PP3_1, PP3_2, . . . and, after shifting and adding, all products (Mi, each is Ai*Bi) are calculated. For example, when the word length is 4 bits and unsigned calculations are performed, partial products PP0, PP1 and PP2_1 are selected to be shifted and added to generate a product M0_4bit (which is A0_4bit*B0_4bit), partial products PP3_1, PP4 and PP5_1 are selected to be shifted and added to generate a product M1_4bit (which is A1_4bit*B1_4bit), partial products PP6_1, PP7 and PP8_1 are selected to be shifted and added to generate a product M2_4bit (which is A2_4bit*B2_4bit). The remaining products can be calculated in the similar way. When the word length is 8 bits and unsigned calculations are performed, partial products PP0, PP1, PP2_2, PP3_2, PP4, and PP5_1 are selected to be shifted and added to generate a product M0_8bit (which is A0_8bit*B0_8bit), partial products PP6_1, PP7, PP8_2, PP9_2, PP10, and PP11_1 are selected to be shifted and added to generate a product M1_8bit (which is A1_8bit*B1_8bit). The remaining products can be calculated in the similar way. When the field "Operation" indicates a multiplication operation, the digital bits of the different products Mi are combined together as data M to be output by the datapath 1000. When the field "Operation" indicates a multiply-and-accumulate calculation, the different products Mi are accumulated as data S and the datapath 1000 outputs the data S.

The microprocessor of the invention can be applied to implement artificial intelligence technology, and is adaptive to various word lengths (possibly as low as 1~2 bits) adopted in neural network computing. Particularly, large-scale tensor calculations are effectively performed by the microprocessor.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A microprocessor with dynamically adjustable bit width, comprising:
a bit width register, storing at least one bit width;
a datapath, operating according to the bit width stored in the bit width register to acquire input operands from received data and process the input operands;
a statistical register, collecting a plurality of calculation results of a plurality of calculations of the datapath; and
a bit width adjuster, monitoring statistics of the plurality of calculation results, and adjusting the bit width stored in the bit width register based on the statistics of the plurality calculation results collected in the statistical register;
wherein:
the bit width indicates a word length;
the bit width adjuster monitors numerical distribution of the calculation results collected by the statistical register and adjusts the word length based on the numerical distribution;
when the numerical distribution is at a sparse degree higher than a first judgement threshold for numerical distribution, the bit width adjuster reduces the word length; and
when the sparse degree is lower than a second judgement threshold for numerical distribution, the bit width adjuster increases the word length.
2. The microprocessor as claimed in claim 1, wherein:
the bit width indicates a word length; and
the received data includes an integer part and a fractional part, and the word length is a total length of the integer part and the fractional part.
3. The microprocessor as claimed in claim 1, wherein:
the bit width indicates a fraction length; and
the received data includes an integer part and a fractional part, and the fraction length is a length of the fractional part.
4. The microprocessor as claimed in claim 1, wherein:
the bit width adjuster monitors overflows of the calculation results collected by the statistical register and adjusts the bit width based on the overflows.
5. The microprocessor as claimed in claim 4, wherein:
when the number of overflows of the calculation results collected by the statistical register exceeds a threshold, the bit width adjuster reduces a fraction length that is indicated by the bit width.
6. The microprocessor as claimed in claim 1, wherein:
the bit width adjuster comprises an MSB bit overflow counter, an (MSB-1) bit overflow counter and a difference monitoring module;
the MSB bit overflow counter counts overflows on a most significant bit of every calculation result collected by the statistical register and thereby outputs an MSB bit overflow count;
the (MSB-1) bit overflow counter counts overflows on an (MSB-1) bit of every calculation result collected by the statistical register and thereby outputs an (MSB-1) bit overflow count; and
the difference monitoring module monitors a difference between the MSB bit overflow count and the (MSB-1) bit overflow count for the bit width adjuster to adjust the bit width.
7. The microprocessor as claimed in claim 6, wherein:
when the MSB bit overflow count exceeds the (MSB-1) bit overflow count by a first threshold, the bit width adjuster reduces a fraction length that is indicated by the bit width; and
when the (MSB-1) bit overflow count exceeds the MSB bit overflow count by a second threshold, the bit width adjuster increases the fraction length.
8. The microprocessor as claimed in claim 1, wherein:
the bit width adjuster comprises a histogram creation module and a determining module;
the histogram data creation module outputs the numerical distribution of the calculation results collected by the statistical register;
when the determining module determines from the numerical distribution that the numerical distribution is at a sparse degree higher than the first judgement threshold, the bit width adjuster reduces the word length; and when the determining module determines that the numerical distribution is at a uniform status, the bit width adjuster increases the word length.

9. The microprocessor as claimed in claim 1, wherein:
the bit width register stores a first bit width, a second bit width, a third bit width and a fourth bit width;
after acquiring the input operands based on the first bit width and processing the input operands based on the second bit width, the datapath uses the third bit width to output a first set of calculation results and the bit width adjuster makes an adjustment on the fourth bit width; and
after acquiring the input operands based on the third bit width and processing the input operands based on the fourth bit width, the datapath uses the first bit width to output a second set of calculation results and the bit width adjuster makes an adjustment on the second bit width.

10. The microprocessor as claimed in claim 9, wherein:
before outputting the second set of calculation results based on the first bit width, the bit width adjuster updates the first bit width as the adjusted fourth bit width.

11. The microprocessor as claimed in claim 9, wherein:
the datapath uses the first bit width and the second bit width for a first layer of calculations of a neural network;
the datapath uses the third bit width and the fourth bit width for a second layer of calculations of the neural network;
the second layer of calculations are performed after the first layer of calculations;
the datapath uses the first bit width and the second bit width for a third layer of calculations of the neural network; and
the third layer of calculations are performed after the second layer of calculations.

12. The microprocessor as claimed in claim 11, wherein:
the datapath uses the third bit width to output the first set of calculation results calculated from the first layer of calculations;
when finishing the first layer of calculations, the bit width adjuster updates the first bit width as the fourth bit width that has been adjusted by the first layer of calculations;
the datapath uses the adjusted first bit width to output the second set of calculation results calculated from the second layer of calculations; and when finishing the second layer of calculations, the bit width adjuster updates the third bit width by the second bit width that has been adjusted by the second layer of calculations.

13. The microprocessor as claimed in claim 9, wherein:
the datapath operates according to a single instruction multiple data (SIMD) instruction;
a first field of the SIMD instruction is designed to instruct the datapath to use the first bit width and the second bit width or use the third bit width and the fourth bit width for calculations; and
a second field of the single instruction multiple data instruction is designed to indicate the third bit width and the fourth bit width or indicate the first bit width and the second bit width, and thereby the datapath is switched to output the calculation results according to the third bit width or the first bit width, and make adjustments on the fourth bit width or the second bit width.

14. The microprocessor as claimed in claim 13, wherein:
a third field of the SIMD instruction is designed to clear the statistical register or to process values in the statistical register by saturation arithmetic.

15. The microprocessor as claimed in claim 1, wherein:
the datapath operates according to a single instruction multiple data (SIMD) instruction;
the SIMD instruction includes a first source operand field, a second source operand field and a destination operand field;
the first source operand is designed to indicate first input data;
the second source operand is designed to indicate second input data;
the destination operand is designed to indicate storage target of an output operand;
the datapath operates according to the bit width to divide the first source operand and the second source operands to acquire the input operands which are processed by the datapath for generation of the output operand.

16. The microprocessor as claimed in claim 1, wherein:
the bit width register is initialized by a microinstruction.

17. The microprocessor as claimed in claim 1, wherein:
the bit width register is designed as a specific-purpose register in the microprocessor; and
the statistical register is implemented by a general-purpose register of the microprocessor.

18. The microprocessor as claimed in claim 1, wherein:
the datapath performs multiplications or a multiply-and-accumulate calculation.

* * * * *